United States Patent
Weitzman

(10) Patent No.: US 11,151,895 B2
(45) Date of Patent: Oct. 19, 2021

(54) POPULATION-SAMPLE REGRESSION IN THE ESTIMATION OF POPULATION PROPORTIONS

(71) Applicant: Ronald Weitzman, Carmel, CA (US)

(72) Inventor: Ronald Weitzman, Carmel, CA (US)

(*) Notice: Subject to any disclaimer, the term of this patent is extended or adjusted under 35 U.S.C. 154(b) by 403 days.

(21) Appl. No.: 16/267,276

(22) Filed: Feb. 4, 2019

(65) Prior Publication Data

US 2019/0236973 A1 Aug. 1, 2019

Related U.S. Application Data

(63) Continuation-in-part of application No. 13/923,217, filed on Jun. 20, 2013, now Pat. No. 10,198,961, which is a continuation of application No. 11/845,677, filed on Aug. 27, 2007, now Pat. No. 10,957,217, and a continuation of application No. 12/972,397, filed on Dec. 17, 2010, now abandoned.

(60) Provisional application No. 60/823,625, filed on Aug. 25, 2006, provisional application No. 61/288,156, filed on Dec. 18, 2009.

(51) Int. Cl.
*G09B 19/00* (2006.01)
*G06Q 10/04* (2012.01)

(52) U.S. Cl.
CPC ............ *G09B 19/00* (2013.01); *G06Q 10/04* (2013.01)

(58) Field of Classification Search
CPC ......... G09B 19/00; G06N 7/005; G06Q 10/04
See application file for complete search history.

(56) References Cited

U.S. PATENT DOCUMENTS

| | | | | | |
|---|---|---|---|---|---|
| 5,059,127 | A | * | 10/1991 | Lewis | G09B 19/00 434/353 |
| 2001/0034023 | A1 | * | 10/2001 | Stanton, Jr. | C12Q 1/6883 435/6.16 |
| 2003/0004777 | A1 | * | 1/2003 | Phillips | G06Q 10/04 705/7.28 |
| 2003/0101028 | A1 | * | 5/2003 | Banks | G06Q 30/02 702/189 |
| 2003/0204311 | A1 | * | 10/2003 | Bush | G01V 3/38 702/13 |
| 2004/0023211 | A1 | * | 2/2004 | Groen | G16H 20/10 435/5 |

(Continued)

FOREIGN PATENT DOCUMENTS

| | | |
|---|---|---|
| WO | 2006119437 | 11/2006 |
| WO | 2015077708 | 5/2015 |

*Primary Examiner* — Jerry-Daryl Fletcher

(57) ABSTRACT

Accordingly, embodiments of the present invention advantageously account for item discrimination in a single-parameter logistic model used for measuring a test-taker's ability and an item's difficulty. Accounting for item discrimination improves the reliability of a test without increasing the number of test items. To account for item discrimination in a single-parameter logistic model, this invention uses the correlation between item response (correct or incorrect) and total test score or other measure of test-taker ability to obtain a Bayesian estimate of the correct-response probability (between zero and one). This correlation is a measure of item discrimination. The numerator in the formula for this correlation contains the difference between the average test score of test-takers who got the item right and the average test score of test-takers who got the item wrong.

20 Claims, 12 Drawing Sheets

Flowchart for estimation of population proportions based on population-on-sample regression

(56) References Cited

U.S. PATENT DOCUMENTS

| | | | |
|---|---|---|---|
| 2004/0073475 A1* | 4/2004 | Tupper | G06Q 10/06 703/2 |
| 2004/0142496 A1* | 7/2004 | Nicholson | G01R 33/4625 436/536 |
| 2004/0143403 A1* | 7/2004 | Brandon | G16B 40/00 702/19 |
| 2004/0153330 A1* | 8/2004 | Miller | G06Q 50/16 705/38 |
| 2005/0037515 A1* | 2/2005 | Nicholson | G01R 33/465 436/173 |
| 2005/0171503 A1* | 8/2005 | Van Den Berghe | A61M 5/1723 604/504 |
| 2005/0197875 A1* | 9/2005 | Kauffman | G06Q 40/08 705/7.26 |
| 2006/0041403 A1* | 2/2006 | Jaber | G06F 17/18 702/189 |
| 2006/0111849 A1* | 5/2006 | Schadt | G16B 20/00 702/20 |
| 2006/0141489 A1* | 6/2006 | Allison | G16B 25/00 435/6.16 |
| 2006/0248031 A1* | 11/2006 | Kates | G16H 50/20 706/25 |
| 2007/0027634 A1* | 2/2007 | Mendrick | G01N 33/5014 702/20 |
| 2007/0043610 A1* | 2/2007 | Wang | G07C 13/00 705/12 |
| 2007/0093969 A1* | 4/2007 | Mendrick | C12Q 1/6876 702/20 |
| 2008/0114564 A1* | 5/2008 | Ihara | G06F 16/353 702/158 |
| 2008/0133174 A1* | 6/2008 | Weitzman | G06Q 10/04 702/179 |
| 2008/0214151 A1* | 9/2008 | Ramer | G06F 16/68 455/414.1 |
| 2008/0214157 A1* | 9/2008 | Ramer | G06F 16/68 455/414.1 |
| 2009/0098533 A1* | 4/2009 | Munnes | G01N 33/57484 435/6.16 |
| 2009/0132347 A1* | 5/2009 | Anderson | G06Q 30/02 705/14.52 |
| 2009/0181863 A1* | 7/2009 | Milstein | G01N 33/68 506/18 |
| 2009/0246774 A1* | 10/2009 | Khatkar | C12Q 1/6883 435/6.11 |
| 2009/0258848 A1* | 10/2009 | Chakravarti | C12Q 1/6883 514/177 |
| 2015/0192587 A1* | 7/2015 | Wild | G01N 33/57419 435/7.92 |

* cited by examiner

Table 1

Beta distributions: $\hat{\pi} \pm 1.93\sigma_{(\hat{\pi}-\pi)}$ interval coverage

| Mean | Standard deviation ($\sigma_{(\hat{\pi}-\pi)}$) | | | | | | | | |
|---|---|---|---|---|---|---|---|---|---|
| ($\hat{\pi}$) | .005 | .010 | .015 | .020 | .025 | .030 | .035 | .040 | .045 | .050 |
| .05 | .950 | .952 | .954 | .956 | .956 | .953 | .951 | .949 | .948 | .946 |
| .10 | .950 | .950 | .951 | .952 | .953 | .954 | .956 | .956 | .957 | .956 |
| .15 | .949 | .950 | .950 | .951 | .951 | .952 | .953 | .953 | .954 | .955 |
| .20 | .950 | .950 | .950 | .950 | .951 | .951 | .951 | .952 | .952 | .953 |
| .25 | .950 | .950 | .950 | .950 | .950 | .951 | .951 | .951 | .951 | .952 |
| .30 | .951 | .950 | .950 | .950 | .950 | .950 | .951 | .951 | .951 | .951 |
| .35 | .946 | .950 | .950 | .950 | .950 | .950 | .950 | .951 | .951 | .951 |
| .40 | .949 | .950 | .950 | .950 | .950 | .950 | .950 | .950 | .951 | .951 |
| .45 | .951 | .950 | .950 | .950 | .950 | .950 | .950 | .950 | .950 | .951 |
| .50 | .952 | .950 | .950 | .950 | .950 | .950 | .950 | .950 | .950 | .950 |

FIG. 6

Table2

95% Error margins for population proportions: Three textbooks

| Procedure | Estimated proportion and margins of error (±) | | |
|---|---|---|---|
| | Old text | Text: open | Text: choice |
| Frequentist | .29 | .35 | .36 |
| | ±.04 | ±.04 | ±.04 |
| Minimax | .29 | .35 | .36 |
| | ±.04 | ±.04 | ±.04 |
| Fienberg & Holland (1973) | .30 | .34 | .35 |
| | ±.03 | ±.04 | ±.04 |
| Regression ($\pi$ on $P$) | .31 | .34 | .34 |
| | ±.03 | ±.03 | ±.03 |

Note. The frequentist proportions are also the observed proportions (n = 450).

FIG. 7

| Sample sizes required for different error margins in Bayesian & Classical estimation of population proportions ||||
| --- | --- | --- | --- |
| Error Margin | Bayesian one-sided | Bayesian two-sided | Classical (two-sided) |
| .03 | 525 | 825 | 1067 |
| .035 | 400 | 600 | 784 |
| .04 | 300 | 475 | 600 |
| .045 | 250 | 375 | 474 |
| .05 | 200 | 300 | 384 |

Note. Bayesian sample sizes were determined in simulations with increments of 25.

FIG. 9

| Model | Item | | | | | | | | | | Mean | $r_{\hat{b}b}$ |
|---|---|---|---|---|---|---|---|---|---|---|---|---|
| | 1 | 2 | 3 | 4 | 5 | 6 | 7 | 8 | 9 | 10 | | |
| True and estimated *b* values | | | | | | | | | | | | |
| True | -1.50 | -1.50 | -0.75 | -0.75 | 0.00 | 0.00 | 0.75 | 0.75 | 1.50 | 1.50 | 0.00 | - |
| Rasch | -1.43 | -1.51 | -0.73 | -0.77 | -0.02 | 0.04 | 0.59 | 0.73 | 1.43 | 1.57 | -0.01 | .999 |
| Delta | 0.61 | 0.81 | 0.62 | 0.92 | 0.90 | 1.09 | 1.26 | 1.32 | 1.64 | 1.68 | 1.09 | .939 |
| Hybrid | -1.43 | -1.51 | -0.73 | -0.77 | -0.02 | 0.04 | 0.59 | 0.73 | 1.43 | 1.57 | -0.01 | .999 |
| Biserial delta | 0.66 | 0.80 | 0.60 | 0.84 | 0.88 | 1.03 | 1.24 | 1.23 | 1.51 | 1.61 | 1.04 | .718 |
| Rasch K | -3.57 | -13.0 | -1.23 | -6.34 | 0.17 | 0.44 | 1.14 | 6.71 | 3.04 | 8.86 | -0.37 | .857 |
| Discrimination Data | | | | | | | | | | | | |
| $r_{x\theta}$ | .534 | .144 | .737 | .144 | .792 | .144 | .706 | .144 | .510 | .144 | .400 | - |
| $\hat{a}$ | .455 | .097 | .758 | .099 | 1.17 | .104 | 1.21 | 0.91 | .719 | .159 | .487 | - |
| t-Fit | -1.85 | 2.85 | -5.32 | 5.14 | -7.86 | 5.77 | -4.72 | 5.58 | -2.58 | 2.00 | - | - |

POPULATION-SAMPLE REGRESSION IN THE ESTIMATION OF POPULATION PROPORTIONS

CROSS-REFERENCE TO RELATED APPLICATIONS

This application is a Continuation-in-Part of and claims benefit to co-pending, commonly owned U.S. patent application Ser. No. 13/923,217, filed Jun. 20, 2013, which was a continuation of U.S. patent application Ser. No. 11/845, 677 filed Aug. 27, 2007 which claimed the benefit of U.S. Provisional Patent Application No. 60/823,625 filed Aug. 25, 2006, and was a continuation of U.S. patent application Ser. No. 12/972,397 filed Dec. 17, 2010, which claimed the benefit of U.S. Provisional Patent Application No. 61/288, 156 filed Dec. 18, 2009, all of which are incorporated herein by reference.

BACKGROUND OF THE INVENTION

There are numerous methods of estimating population proportions for polls. In 1961, James and Stein derived estimators of population means that are more efficient than corresponding traditional estimators by using a linear combination of the mean of an individual sample and the overall mean of the sample aggregated with two or more other samples from possibly different populations. Being within the 0-1 interval, the weight applied to each individual sample mean is called a shrinkage coefficient.

Commenting on the empirical Bayesian treatment of James-Stein estimators by Efron and Morris (1973), Stigler (1983, 1990) showed that the shrinkage coefficient was an estimator of the squared correlation coefficient in the regression of population on sample means. Fienberg and Holland (1973) extended the empirical Bayesian treatment of James-Stein estimators to single-sample population proportions, with the expected increase in efficiency.

Likewise, there are numerous methods of testing the ability of a subject and/or the difficulty of a task. Testing methods originally tended to focus on the total test score. Over time testing methods have developed to include a focus on individual responses.

As the focus on total test scores in classical test theory shifted to individual item responses in modern test theory, the models underlying the theories changed correspondingly from measurement and estimation to probabilistic models. In the measurement model of classical test theory, an observed test score (X) differs from a true test score (T) by error (E): X=T+E. Measurement error (E) formally disappears in modern test theory, where the concept of uncertainty expressed by response probability replaces the concept of imprecision expressed by measurement error. In modern test theory, the probability of a correct response to an item is a function of an examinee's ability ($\theta$) and the item's difficulty (b), as well as possibly other item parameters such as the discrimination parameter (a) and, for multiple-choice items, the guessing-rate parameter (c): P($\theta$, a, b, c). While probabilistic models involving all three item parameters are popular because of their promise of optimal fit, many test developers use the statistically simpler single-parameter logistic model introduced by Rasch (1960):

$$P(\theta; b) = \frac{1}{1 + e^{-(\theta-b)}} \quad (1)$$

the graph of which is an ogive curve centered at b on the $\theta$ scale.

Prior to Rasch (1960), Birnbaum (1958) introduced logistic item response models, his two-parameter version involving both the location (difficulty) parameter b and the slope (discrimination) parameter a:

$$P(\theta; \alpha, b) = \frac{1}{1 + e^{-\alpha(\theta-b)}} \quad (2)$$

Like Equation (1), the graph of Equation (2) is an ogive on the $\theta$ scale centered at b; but, different from Equation (1), the slope of the ogive may vary depending on the value of the parameter a, which, in the context of the relationship between measurement error and response probability, is the focus of this disclosure.

Some test developers may consider the single-parameter model described by Equation (1) as unnecessarily limited in its data-fitting ability in contrast to alternatively available two- or three-parameter models. Yet, studies show that the Rasch model may fit data at least as well as its multiple-parameter counterparts (e.g., Forsyth, Saisangjan, & Gilmer, 1981). Thissen (1982), in particular, showed that the addition of the parameter a to the Rasch model may fail to improve model fit significantly. Because other studies may show otherwise (e.g., DeMars, 2001, and Stone & Yumoto, 2004), some test developers who favor the Rasch model might still wish that a single-parameter logistic model could accommodate differences in item discrimination, as well as item difficulty. At the same time, the allowance of differences in item discrimination to affect the estimation of $\theta$ values may disturb other supporters of the Rasch model because they believe it unfair to weight responses to items differently, at least without informing test-takers. That concern, however, cannot justify counting clearly less and more discriminating items equally in scoring, particularly when the results of equal and appropriate unequal weighting of item responses differ substantially.

Different from the development here, involving estimation of item discrimination from data, Verhelst and Glas (1995) introduced the discrimination parameter $a_i$ into the Rasch model as an unestimated constant to account for varying item discrimination. Because it explicitly lacked the unweighted-scores property of the Rasch model, they also referred to their model simply as a single-parameter logistic model. Weitzman (1996) used an adjustment of $x_{iq}$ like $p_{iq}$ (see below, Detailed Description of Invention) to enable the Rasch model to account for guessing, but that adjustment required the assumption that the guessing rate was constant over items. Weitzman (2009) provides the original account of the invention described here.

Generally, single-parameter models do not tend to account for item discrimination, which is how well the item measures what it is supposed to measure. Single-parameter models do, however, lead to accurate equating of different test forms. Two and three parameters models tend to account for item discrimination. However, two and three parameter models lead to inaccurate equating of different test forms. Accordingly, a need exists for improved test modeling.

SUMMARY OF THE INVENTION

The present technology may best be understood by referring to the following description and accompanying drawings that are used to illustrate embodiments of the present technology directed toward application of regression of a true measurement on an observed measurement to statistical estimation of the true measurement.

In a population proportion on sample proportion regression embodiment of the present technology, a method for determining the results of a poll having a smaller than conventional margin of error for any sample size or a smaller than conventional sample size for any margin of error, the method comprising statistically determining the regression of population on sample proportions by using an unbiased estimator of the square of the correlation between them. Applying this method to a single sample obtained randomly with replacement from a single population results in credibility intervals that are narrower than conventional confidence intervals, shown to be a product of the regression of sample on population proportions. Not only does the squared-correlation estimator function as a shrinkage coefficient in a Bayesian context, but also this correspondence is shown to apply generally to the estimation of population means as well as proportions. In a preferred embodiment, population-sample regression is used to develop corresponding frequentist and Bayesian estimators.

In another embodiment, a method is presented for estimating population from sample proportions that produces margins of error narrower for any specific sample size or that requires a sample size smaller for any specific margin of error than do previously existing methods applied to the same data. This method applies an unbiased estimator of the squared correlation between population and sample proportions to determine point and interval estimates of population proportions in a regression context involving simple random sampling with replacement. In virtually all reasonable applications, assuming a Dirichlet prior distribution, the margin of error produced by this method for a population proportion is shown to be 1.96 times the posterior standard deviation of the proportion.

In regressing a probability of a correct answer on an actual response in an embodiment of the present technology, a delta single-parameter logistic modeling technique is described. The delta single-parameter logistic model includes receiving a response for each item and each test-taker, and a total test score for each test-taker. A correlation between the item response and the total test score over the plurality of test-takers is determined. Using this correlation, which measures item discrimination, a Bayesian estimate of the probability of a correct response by each test-taker to each item is determined. The logit of this probability estimate is computed. The difficulty of each item is estimated as a function of the average logit over the number of test-takers. Each test-taker's ability is also estimated as a function of the average logit and the average difficulty over the number of test items.

In another embodiment, substituting the latest estimated test-taker ability for the total test score, the delta single-parameter logistic modeling technique is iteratively performed to improve the estimate of the test-taker's ability. In yet another embodiment of the present technology, the delta single-parameter logistic modeling technique is combined with a Rasch modeling technique to improve the estimate of the test-taker's ability and the difficulty of the task.

Accordingly, embodiments of the present invention advantageously account for item discrimination in a single-parameter logistic model used for measuring a test-taker's ability and an item's difficulty. Accounting for item discrimination improves the reliability of a test without increasing the number of test items. To account for item discrimination in a single-parameter logistic model, this invention uses the correlation between item response (correct or incorrect) and total test score or other measure of test-taker ability to obtain a Bayesian estimate of the correct-response probability (between zero and one). This correlation is a measure of item discrimination. The numerator in the formula for this correlation contains the difference between the average test score of test-takers who got the item right and the average test score of test-takers who got the item wrong.

BRIEF DESCRIPTION OF THE DRAWINGS

Embodiments of the present technology are illustrated by way of example and not by way of limitation, in the figures of the accompanying drawings and in which like reference numerals refer to similar elements and in which:

FIG. 6 shows credibility-interval coverage of ±1.96 standard errors in most applications of π-on-P estimation.

FIG. 7 shows a comparison of π-on-P with other estimates in a particular example involving three options.

FIG. 9 shows a comparison of samples sizes required to produce commonly used error margins.

DETAILED DESCRIPTION OF THE INVENTION

Figure 1:
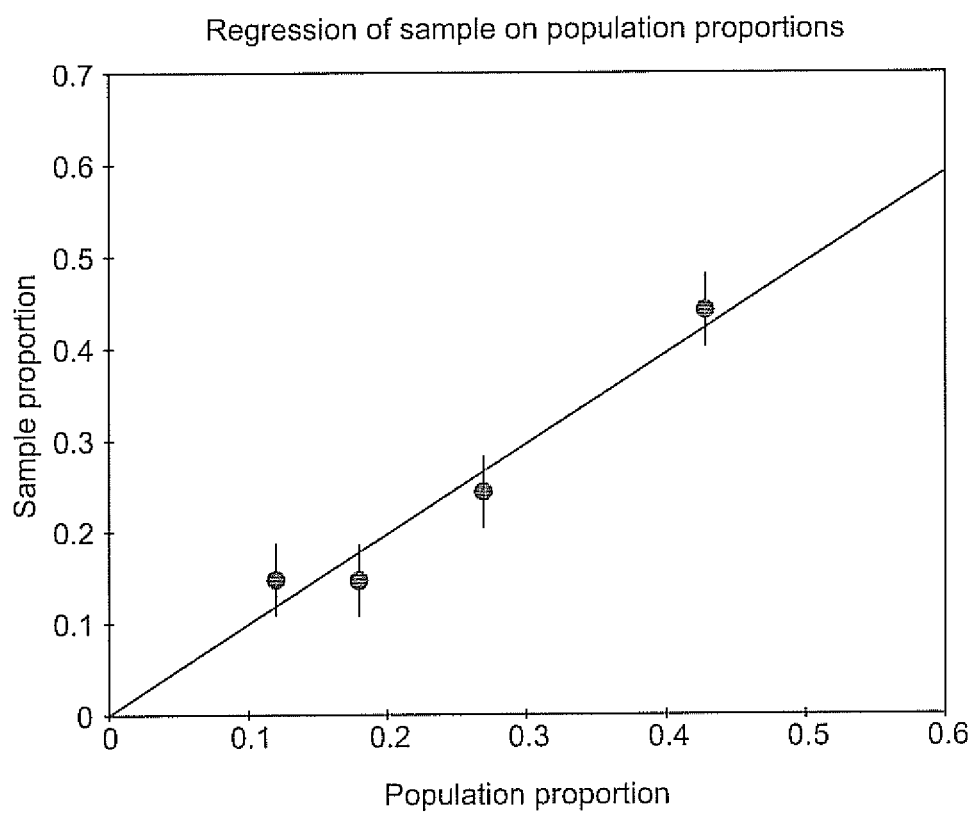
FIG. 1 illustrates the regression of the sample proportion P on the population proportion n.

Reference will now be made in detail to the embodiments of the present technology, examples of which are illustrated in the accompanying drawings. While the present technology will be described in conjunction with these embodiments, it will be understood that they are not intended to limit the invention to these embodiments. On the contrary, the invention is intended to cover alternatives, modifications and equivalents, which may be included within the scope of the invention as defined by the appended claims. Furthermore, in the following detailed description of the present technology, numerous specific details are set forth in order to provide a thorough understanding of the present technology. However, it is understood that the present technology may be practiced without these specific details. In other instances, well-known methods, procedures, components, and circuits have not been described in detail as not to unnecessarily obscure aspects of the present technology.

In this application, the use of the disjunctive is intended to include the conjunctive. The use of definite or indefinite articles is not intended to indicate cardinality. In particular, a reference to "the" object or "a" object is intended to denote also one of a possible plurality of such objects.

Embodiments of the present technology are directed toward simple regression of a "true" measurement on an "observed" measurement. The direction of this regression ("true" on "observed") corresponds to Bayesian analysis, whereas the opposite direction corresponds to classical (or standard) estimation in statistics. In one embodiment, the true measurement may be a population proportion, and the observed measurement may be a corresponding sample proportion. In another embodiment, the true measurement may be the probability of a correct response to an item by a particular person, and the observed measurement may be the actual response by that person to the item. The simple regression involves a correlation between the variables on the two sides of the equation.

In population proportion-on-sample proportion regression embodiments of the present technology, an estimator of population proportions is developed that is even more efficient than the Fienherg-Holland estimator, particularly in a small sample (n<500), and demonstrates that all shrinkage coefficients are estimators of squared correlation coefficients in population-on-sample regression. The margins of error for the population proportions, provided they follow a Dirichlet distribution, are shown to be 1.96 times their standard deviations in virtually all realistic applications. These techniques relate to the technical field of poll-taking, particularly utilizing statistics which encompass the estimation of population proportions from the regression of population on sample proportions. Using an unbiased estimator of the square of the correlation between the population and sample proportions in a Bayesian context produces not only point estimates of the population proportions but also credibility intervals that are narrower than corresponding conventional confidence intervals.

Simple regression analysis in statistics is a procedure for estimating the linear relationship between a dependent variable and an independent variable in a given population. The relationship for standardized variables is expressed as an equation for a straight line in which the coefficient of the independent, or regressed-on, variable in the equation is determined from a sample. While the dependent variable may vary, the regressed-on variable is fixed. This variable is the sample statistic, mean or proportion, in population-on-sample regression. This is why population-on-sample regression corresponds to Bayesian estimation. The opposite is true of sample-on-population regression, which corresponds to frequentist estimation in which the population parameter, mean or proportion, is fixed.

A point-estimation advantage of the population-on-sample regression procedure is that it generally avoids the problem of relative-frequency estimates equal to zero or one by reasonably adjusting them away from these extreme values. This inward adjustment is the result of regression toward the mean, which for relative frequencies is greater than zero and less than one.

Population-on-sample regression shares the efficiency advantage of Bayesian over traditional estimation, which shows itself in a reduction of least-squares risk functions with a corresponding shortening of confidence intervals. In mental test theory, for example, standard errors of estimate, used to determine confidence intervals for true scores, are shorter than standard errors of measurement, used to determine confidence intervals for observed scores. The "shrinkage coefficient" in this case is the squared true-observed-score correlation, and the standard error of estimate is equal to the standard error of measurement time this correlation.

The method comprising embodiments of this invention provides for both point and interval estimation for arriving at usable results of a poll. The approach to each follows both frequentist and Bayesian tracks within a regression framework. Development of either the frequentist or the Bayesian point estimator makes no distributional assumption about the population proportions. Distributional assumptions come into play only in the treatment of interval estimation. Normally a regression approach will require three or more observations to accommodate the need to estimate the slope and the intercept of the regression line from data. However, because the mean requires no estimation in the case of single-sample proportions, being the reciprocal of the number of options or categories, the Bayesian as well as the frequentist point estimator developed herein can apply to data involving only two (binomial or multinomial) observations.

The focus here physically has been on a single sample obtained from a single population. Conceptually, the sample may be one of many that the population can produce or the population may be one of many that can produce the sample. The first possibility underlies the frequentist approach and the second the Bayesian approach to statistical inference. The method constituting embodiments of this invention has adopted the Bayesian approach showing that it can lead through regression to considerably more efficient estimation of population proportions than the frequentist approach, especially for samples no larger than 500.

Although reference is made explicitly to proportions, the method applies equally to other forms of expressing such results of a poll, for example, percentage, fractions, and decimal fractions, with appropriate adjustments known by those skilled in the art.

The following steps develop the regression point and interval estimators in the frequentist (P-on-π) case (Step 1) and in the Bayesian (π-on-P) case (remaining steps).

The Regression of P on π

The frequentist approach to point estimation via regression corresponds to the traditional estimation procedure in which, for a sample of size n, nP (an integer) has a binomial of a multinomial distribution with $E_t(P_{kt})=\pi_k$ for each option k of a total of K options, t indexing the sample. The regression expressing this or the Bayesian approach involves, for a single sample t, the mean $\overline{P}$ and $\mu_\pi$ over options $$\left(\mu_r = \overline{P} = \left(\frac{1}{K}\right)\sum_{k=1}^{K} P_{kt}\right),$$

the standard deviations $S_P$ and $\sigma\pi$ over options $$\left(S_P = \sqrt{(1/K)\sum_{k=1}^{K}(P_{kt}-\mu_P)^2}\right),$$

and the correlation coefficient $\rho_{\pi P}$ over options. To assure that $E_t(P_{kt})=\pi_k$, the slope coefficient in the regression $$P_{kt} = \left(\frac{S_P}{\sigma_\pi}\right)\rho_{\pi P}\pi_k - \left(\frac{S_P}{\sigma_\pi}\right)\rho_{\pi P}\mu_\pi + \overline{P} + \epsilon_{kt} \qquad (3)$$

must be equal to one, the population and sample means $\mu_\pi$ and $\overline{P}$ being equal to 1/K, so that $P_{kt}=\pi_k+\epsilon_{kt}$, where $\epsilon_{kt}$ denotes sampling error. Since $E_t(\epsilon_{kt})=0$, $E_t(P_{kt})=\pi_k$, as in the traditional binomial or multinomial estimation procedure. The regression implication of $E_t(P_{kt})=\pi_k$ then is that the correlation $\rho_{\pi P}$ between $\pi_k$ and $P_{kt}$ must be equal to the ratio of their standard deviations, $\sigma_\pi$ and $\sigma_P$:

$$\rho_{\pi P} = \frac{\sigma_\pi}{S_P} \tag{4}$$

This result resembles a basic result of classical mental test theory (Gulliksen, 1950) in which $\pi$ represents a true and P an observed score. The next section will use this result to obtain an estimator of $\rho_{\pi P}^2$.

Step Two—An Estimator of $\rho_{\pi p}^2$

In this as in the previous section, for each option k, $\pi_k$ as the regressed-on variable is assumed to be fixed while $P_{kt}$ can vary over samples (t=1, 2, . . . ). Ordinarily the exact value of $\rho_{\pi P}^2$ is unknown. Because $P_{kt}$ is a proportion, however, $\sigma_\pi^2$ is expressed in terms of $\sigma_P^2$, the expected value of $S_P^2$, for substitution into Equation (4) to yield an estimator of $\rho_{\pi P}^2$ in which $\sigma_P^2$ is replaced by $S_P^2$:

$$S_P^2 = \frac{1}{K}\sum_{k=1}^{K}(P_{kt}-\mu_P)^2 \tag{5}$$

where $\mu_P$ is the mean of the K values of $P_{kt}$ in sample t. Without further assumptions or conditions, the following derivation leads to the sample estimator of $\rho_{\pi P}^2$ in Equation 15.

In Equation 5, $\mu_P$, equal to 1/K, is the population as well as the sample mean proportion so that $S_P^2$ with K rather than (K−1) in the denominator, is an unbiased estimator of $\sigma_P^2$:

$$\sigma_P^2 = E_t\left(\left(\frac{1}{K}\right)\sum_{k=1}^{K}(P_{kt}-\mu_P)2\right) \tag{6}$$

If $\pi_k = \mu_\pi + \delta_k$, where $$\left(\frac{1}{K}\right)\sum_{k=1}^{K}\delta_k = 0,$$

then $$\sigma_\pi^2 = \left(\frac{1}{K}\right)\sum_{K=1}^{k}\delta_K^2.$$

As noted in the preceding section, $P_{kt}=\pi_k+\in_{kt}$. The expected values of $\in_{kt}$ and $S_k\in_{kt}$ (equal to $\delta_k$ times the expected value of $\in_{kt}$) are equal to zero. Substitution first of $\pi_k+\in_{kt}$ for $P_{kt}$ and then of $\mu_\pi+\delta_k$ for $\pi_k$ in Equation 6 thus, with $\mu_\pi=\mu_P$, leads to $$\sigma_P^2 = \sigma_\pi^2 + \left(\frac{1}{K}\right)\sum_{k=1}^{K}\sigma_{\in k}^2 \tag{7}$$

where, for each option k, $\sigma_{\in k}^2$ is the sampling variance $$\sigma_{\in k}^2 = \left(\frac{1}{n}\right)\pi_k(1-\pi_k) \tag{8}$$

Substitution of $\mu_\pi+\delta_k$ for $\pi_k$ in the computation of the mean of Equation 8 over the K values of $\sigma_{\in k}^2$ produces $$\frac{1}{K}\sum_{k=1}^{K}\sigma_{\in k}^2 = \frac{\mu_k(1-\mu_k)}{n} - \frac{\sigma_\pi^2}{\pi} \tag{9}$$

since $$\sum_{k=1}^{K}\mu_\pi\delta_k = \mu_\pi\sum_{k=1}^{K}\delta_k = 0 \text{ and } \sum_{k=1}^{K}\delta_k^2 = K\sigma_\pi^2,$$

Equation 7 thus becomes $$\sigma_P^2 = \sigma_\pi^2 + \frac{\mu_\pi(1-\mu_\pi)}{n} - \frac{\sigma_\pi^2}{n} \tag{10}$$

or, with $$\frac{1}{K}$$

for $\mu_\pi$, $$\sigma_P^2 = \sigma_\pi^2 + \frac{K-1}{nK^2} - \frac{\sigma_\pi^2}{n} \tag{11}$$

Solution of Equation 11 for $\sigma_\pi^2$ finally yields the expression of $\sigma_\pi^2$ in terms of $\sigma_P^2$:

$$\sigma_\pi^2 = \left(\frac{n}{n-1}\right)\sigma_P^2 - \left(\frac{K-1}{n-1}\right)\left(\frac{1}{K}\right)^2 \tag{12}$$

The formula for $\rho_{\pi P}^2$ is thus $$\rho_{\pi P}^2 = \frac{\left(\frac{n}{n-1}\right)\sigma_P^2 - \left(\frac{K-1}{n-1}\right)\left(\frac{1}{K}\right)^2}{S_P^2} \tag{13}$$

so that the estimator of $\rho_{\pi P}^2$ is $$\hat{\rho}_{\pi P}^2 = \frac{\left(\frac{n}{n-1}\right)S_P^2 - \left(\frac{K-1}{n-1}\right)\left(\frac{1}{K}\right)^2}{S_P^2} \tag{14}$$

or, since $$S_P^2 = \left(\frac{1}{K}\right)\sum_{k=1}^{K} P_k^2 - \left(\frac{1}{K}\right)^2,$$

$$\hat{\rho}_{\pi P}^2 = 1 - \frac{K\left(1 - \sum_{k=1}^{K} P_{kt}^2\right)}{(n-1)\left(K\sum_{k=1}^{K} P_{kt}^2 - 1\right)} \quad (15)$$

where $$\sum_{k=1}^{K} P_{kt}^2$$

is the sum of the squares of the K proportions computed from the sample t of size n. Equation 14 shows that $\hat{\rho}_{\pi P}^2$ is not only an increasing function of $S_P^2$, K, and n but also an unbiased estimator of $\rho_{\pi P}^2$, the $S_P^2$ in the denominator being fixed.

Step Three—Point Estimation: Estimation of π for P

The regressions underlying the developments in this and the preceding section are opposite in direction. Both involve P and π. The development in the preceding section considered π as fixed and P as variable. In the development here, however, the reverse is true: P is fixed, and π is variable. In this development, the fixed-$P_k$ sample (k=1, 2, . . . , K) comes from a single population, which is one of any number of possible populations, with their correspondingly different $\pi_k$ values. Although the expected value of variable $P_k$ is $\pi_k$, the expected value of a variable $\pi_k$ is not $P_k$, but a value $\hat{\pi}_k$ somewhere between $P_k$ and 1/K. Whereas the direction of regression assumed in the proceeding section worked for the development of a formula for $\hat{\rho}_{\pi P}^2$, the regression direction taken here is particularly appropriate for the estimation of an unknown $\pi_k$, assumed variable, from a known $P_k$, assumed fixed for each option k:

$$\hat{\pi}_k = \rho_{\pi P}\left(\frac{\sigma_P}{S_P}\right)P_k - \rho_{\pi P}\left(\frac{\sigma_P}{S_P}\right)\overline{P} + \mu_\pi \quad (16)$$

where $\hat{\pi}_k$ is the regression estimate of $\pi_k$, $\rho_{\pi P}$ is the correlation between $P_k$ and $\pi_k$ for the population sampled from, and $\mu_P$ and $\mu_\pi$ are the means and $S_P$ and $\sigma_\pi$ are the standard deviations over options of $P_k$ and $\pi_k$, respectively. Since $\rho_{\pi P}^2 = \sigma_\pi^2/S_P^2$, this equation simplifies to $$\hat{\pi}_k = \rho_{\pi P}^2 P_k - \rho_{\pi P}^2 \overline{P} + \mu_\pi \quad (17)$$

where $\mu_\pi$ is equal to $\overline{P}$ so that, with both $\mu_\pi$ and P denoted by μ, $$\hat{\pi}_k = \rho_{\pi P}^2 P_k + (1 - \rho_{\pi P}^2)\mu \quad (18)$$

or, since μ=1/K, $$\hat{\pi}_k = \rho_{\pi P}^2 P_k + \frac{1 - \rho_{\pi P}^2}{K} \quad (19)$$

Estimation of the population proportion $\pi_k$ corresponding to the observed proportion $P_k$ thus requires knowledge only of $\rho_{\pi P}^2$. If $\rho_{\pi P}^2=1$, $\hat{\pi}_k=P_k$; if $\rho_{\pi P}^2=0$, $\hat{\pi}_k=1/K$. Generally, in practice, $f_k$ will be somewhere between $P_k$ and 1/K.

Since $P_k$ is assumed fixed, substitution of $\hat{\rho}_{\pi P}^2$ for $\rho_{\pi P}^2$ in Equation 19 yields an estimate of $\pi_k$ that is not subject to sampling variation.

Figure 2:
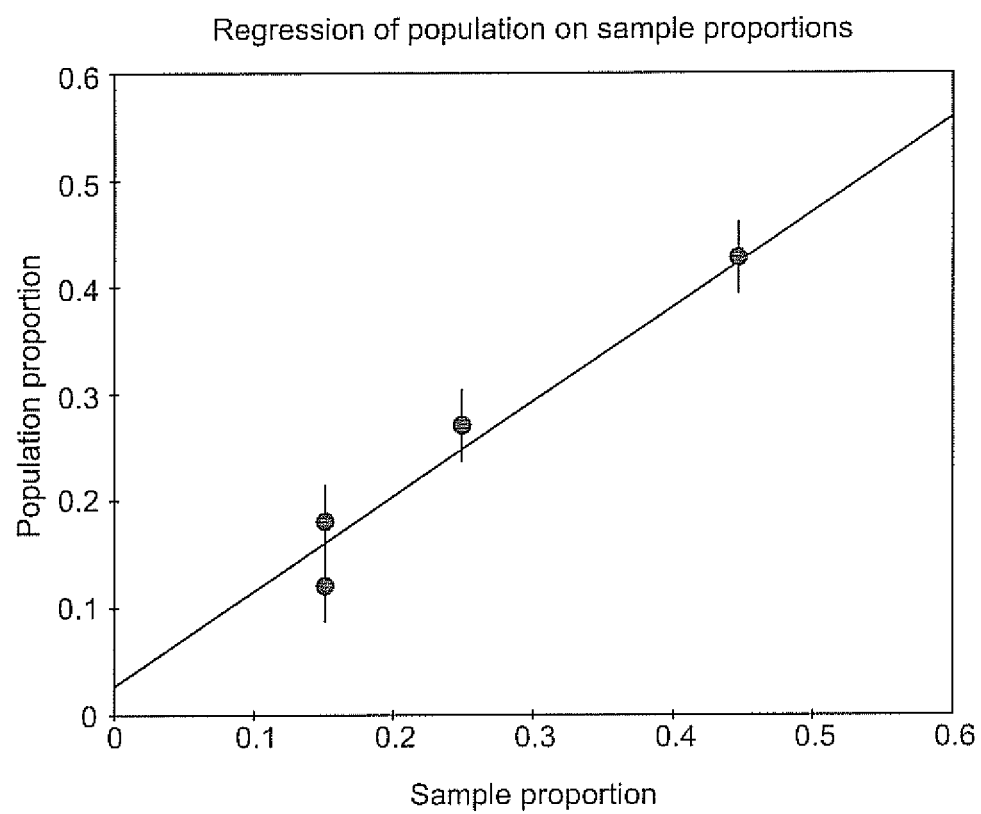
FIG. 2 illustrates the regression of the population proportion π on the sample proportion P.

FIG. 1 illustrates the regression of P on π and FIG. 2 the regression of π on P. In both figures, the population proportions are fictitious since their actual values are unknown. Knowledge of these values is unnecessary because the only requirements for estimation are the sample proportions in FIG. 1 and the regression line in FIG. 2. The vertical lines define 95% confidence intervals. Based on n=100, the value of $\hat{\rho}_{\pi P}^2$ is 0.88, the slope of the regression line in FIG. 2. In addition to their different slopes, the two regression lines notably have different intercepts: 0 in FIG. 1 and 0.03 in FIG. 2. Except when $\rho_{\pi P}^2=1$, π-on-P regression produces population-proportion estimates that are greater than zero and less than one.

Two examples provide data to illustrate the π-on-P regression procedure. The first, cited by Tull and Hawkins (1993, pp. 745-746) in the spirit of R. A. Fisher's classic tea-testing illustration of the Student t-test, was a Carnation taste test comparing Coffee-mate to real cream. Of 285 participants who claimed to be able to distinguish between two cups of coffee presented them, one containing Coffee-mate and the other containing cream, 153 were correct and 132 were incorrect, the corresponding proportions being 0.54 and 0.46. With $\hat{\rho}_{\pi P}^2=0.42$, the Bayesian-estimated proportions were 0.52 and 0.48, respectively. These proportions more strongly than their frequentist counterparts support the conclusion that people could not tell the difference between Coffee-mate and real cream.

In the second example, a large school district tested three different textbooks for first-year high school algebra. The first was the book used for the past several years; the second and third were new books containing questions taken from recent versions of a statewide mathematics examination. The question format differed in these books, being open-ended in the second book and multiple-choice (as in the statewide examination) in the third book. Two hundred students in different classes used each book. Of the 450 students who passed the statewide examination, 130 had used the first book, 158 the second book, and 162 the third book. The corresponding proportions were 0.29, 0.35, and 0.36, respectively. Substituting these proportions, which sum to 1.00, in Equation 13, together with K=3 and n=450 yields 0.48 for the value of $\hat{\rho}_{\pi P}^2$, and using this value for $\rho_{\pi P}^2$ in Equation 19 yields $\hat{\pi}_k$ values of 0.31, 0.34 and 0.35 for the three books, respectively. The first and third values notably differ (by 0.02 each) from their uncorrected counterparts while the second, being closer to the mean of 0.33, shows a difference of only 0.01, to two decimal places. If the books had been equally effective, the expected proportions within the passing group would be equal to 0.33 for students using all three books.

Step 4A—Interval Estimation: Two-Option Case

Reported survey results often include half the size of the 95% confidence interval as the so called "margin of error." For K=2, the procedures developed in this embodiment of the invention involve intervals different from the conventional ones. The confidence or credibility intervals appropriate for the K=2 procedures developed here are functions of the standard error of measurement, applicable to the regression of P on $\pi$, or the standard error of estimate, applicable to the regression of $\pi$ on P (Kelley, 1923, 1927). Both standard errors involve the assumption of homoscedasticity: Values of the standard errors of measurement are equal for all values of $\pi_k$, and values of the standard error of estimate are equal for all values of $P_k$ (k=1, 2, 3 ..., K). In the case of proportions, as opposed to means of multi-valued variables, this assumption makes sense only when K=2.

Though of less practical value, the standard error of measurement, $\sigma_{P-\pi} = S_P\sqrt{1-\rho_{\pi P}^2}$, produces confidence intervals directly comparable to the conventional ones. Estimates of $\sigma_{P-\pi}$ are obtainable by using $\hat{\rho}_{\pi P}^2$ for $\rho_{\pi P}^2$ in the formula for $\sigma_{P-\pi}$.

The Carnation data provide an example. The two observed proportions, 0.54 and 046, were inaccurate by an amount equal to ±0.06. As the conventional 95% margin of error, this value (0.06) is 1.96 times $$\sqrt{0.5\frac{1-0.5}{285}}.$$

Use of the standard error of measurement would produce a 95% confidence interval of the same size, to two decimal places. Substituting the value of 0.04 for $S_P$ and the $\hat{\rho}_{\pi P}^2$ value of 0.42 for $\rho_{\pi P}^2$ yields $\sigma_{P-\pi}=0.03$, or (multiplying 0.03 by 1.96) a 95% error margin of 0.06.

Confidence intervals determined from the standard error of measurement are directly comparable to conventionally determined confidence intervals because both are based on the assumption of a fixed $\pi$ and a variable P. The standard error of estimate, applicable in the regression case of a fixed P and a variable $\pi$, has the same formula as the standard error of measurement with the exception that $\sigma_\pi$ replaces $S_P$: $\sigma_{\hat{\pi}-\pi}=\sigma_\pi\sqrt{1-\rho_{\pi P}^2}$. Since $\rho_{\pi P}^2=\sigma_\pi^2/s_P^2$, the standard error of estimate will, except when $\rho_{\pi P}^2=1$, be smaller than the standard error of measurement by a factor of $\rho_{\pi P}$. Conceptually, the standard error of estimate should be smaller than the standard error or measurement because the difference (P−$\pi$) contains a varying component representing bias that is absent in the difference ($\hat{\pi}-\pi$). Credibility intervals for a variable $\pi$ will therefore generally be smaller than corresponding confidence intervals for a variable P. When K=2, the estimate of $\sigma_{\hat{\pi}-\pi}$ corresponding to $\sigma_{p-\pi}$ is equal to the estimate of $\sigma_{p-\pi}$ multiplied by $\hat{\rho}_{\pi P}$.

In the Carnation example, with $\hat{\rho}_{\pi P}^2=0.42$, the standard error of estimate is $\sqrt{0.42}$ times 0.03 (the standard error of measurement), or 0.019, so that the 95% margin of error (1.96 times 0.019) is ±0.04. This (rounded from 0.037) is considerably smaller than the conventional error margin of ±0.06. The sample of 285 would, in fact, have to be 417 larger (a total of 702 respondents) to achieve the same ±0.04 margin of error conventionally. Since both the confidence and the credibility intervals overlap the chance proportion of 0.50, the data do not support the claim that tasters can tell cream from Coffee-mate.

For the ±credibility interval to be comparable to the conventional ±0.06 confidence interval, it must also contain 95% of the area under its frequency curve. The next section will investigate the extent to which this is the case not only here but also more generally.

Question—do ±1.96 Standard Errors Constitute 95% Credibility Intervals in $\pi$-On-P Estimation?

The answer, generally, is yes, as this section demonstrates.

Corresponding to the assumption of a binomial distribution for sample proportions is the assumption of a beta distribution for population proportions. One distribution is the conjugate of the other. Dirichlet distributions are correspondingly conjugates of multinomial distributions. Such assumptions of conjugate distributions are common in Bayesian analysis (e.g., Good, 1965, Chapter 3). Under the beta-distribution assumption, not only does the ±0.04 credibility interval of the Carnation example contain 95% of the area under its frequency curve but also, as FIG. 6 shows, ±1.96$\sigma_{\hat{\pi}-\pi}$ credibility intervals ranging from ±0.01 to ±0.1 of point estimates ($\hat{\pi}$) between 0.05 and 0.50 will generally contain 95% of possible $\pi$ values. (No subscript for $\pi$ is necessary here because a beta distribution involves only two proportions, $\pi$ and 1−$\pi$.) The coverage shown in FIG. 6 is based on calculations, not Monte Carlo sampling. FIG. 6 shows confidence-interval proportions for values of $\hat{\pi}$ not only between 0.05 and 0.50 but also, though indirectly, between 0.50 and 0.95. Because beta distributions having mean values between 0.50 and 0.95 are mirror images of beta distributions having mean values between 0.05 and 0.50, the credibility-interval proportion of $\hat{\pi}$ is equal to the credibility-interval proportion for 1−$\hat{\pi}$, provided that both distributions have equal standard deviations ($\sigma_{\hat{\pi}-\pi}$).

FIG. 6 shows credibility-interval proportions as a function of beta-distribution means and standard deviations because these are the parameters involved in the determination of credibility intervals. Beta distributions, however, are functions of two parameters, a and b, related to beta-distribution means ($\hat{\pi}$) and standard deviations ($\sigma_{\hat{\pi}-\pi}$), as follows:

$$a = \hat{\pi}(a+b) \tag{20}$$

and $$b = (1-\hat{\pi})(a+b) \tag{21}$$

where $$a+b = \frac{\hat{\pi}(1-\hat{\pi})}{\sigma_{\hat{\pi}-\pi}^2} - 1 \tag{22}$$

For the Carnation data, a+b=0.52(1−0.52)/(0.019)²−1, or 690, so that a=0.52(690), or 359, and b=(1−0.52)690, or 331, and for these values of a and b the interval between 0.52−1.96(0.019) and 0.52+1.96(0.019) contains 95% of the area under the beta-distribution frequency curve. FIG. 6 shows this result in the row for 0.50 (close to 1-0.52) and the column for 0.020 (close to 0.019).

The two standard errors, the standard error of measurement and the standard error of estimate, differ not only in the lengths of the confidence or credibility intervals that they produce but also in one other important respect: While the standard error of measurement, computed from $S_p$ and $\hat{\rho}_{\pi P}^2$ (itself a function of $S_p$), is subject to sampling variation due to the possible variation of P for each option over samples, the standard error of estimate does not change because under the π-on-P assumption governing its use each P remains constant while only π can change for each option. In both these respects, the standard error of estimate is superior to the standard error of measurement for use in the determination of credibility or confidence intervals for population proportions.

The results shown in FIG. 6 are applicable to Dirichlet as well beta distributions because a beta distribution describes each Dirichlet proportion if all the other proportions are aggregated as its complement.

Step 4B—Interval Estimation: Case of Two or More Options

The standard error of estimate provides the basis for a common credibility interval, applicable particularly for proportions when K=2. The assumption of a Dirichlet prior distribution for the population proportions makes possible the determination of a different interval for each proportion when K≥3. (When K=2, the two intervals are the same.) If τ designates the total of the parameters of a Dirichlet distribution, then the posterior variance of $\pi_k$ for option k is $$\mathrm{Var}(\pi_k \mid P_k) = \frac{\hat{\pi}_k(1-\hat{\pi}_k)}{\tau+n+1} \quad (23)$$

where $P_k$ is the observed proportion for option k. Use of this equation, with $\hat{\pi}_k$ from Equation 19 estimating the expected value of $\pi_k$, requires knowledge of τ.

Since $$E(\pi_k \mid P_k) = \frac{\tau\hat{\pi}_k + nP_k}{\tau+n}$$

for a Dirichlet distribution, the Direchlet shrinkage coefficient corresponding to $\hat{\rho}_{\pi P}^2$ here is n/(τ+n), and so for the π-on-P procedure $$\tau_{\pi \mid P} = \frac{n(1-\hat{\rho}_{\pi P}^2)}{\hat{\rho}_{\pi P}^2} \quad (24)$$

or, from Equation 15, $$\tau_{\pi \mid P} = \frac{K\left(1 - \sum_{k=1}^{K} P_k^2\right)}{K \sum_{k=1}^{K} P_k^2 - 1 - \frac{K-1}{n}} \quad (25)$$

According to Fienberg and Holland (1973), the minimax value of τ is √n and the maximum-likelihood estimator of τ is $$\tau_{\pi \mid P} = \frac{K\left(1 - \sum_{k=1}^{K} P_k^2\right)}{K \sum_{k=1}^{K} P_k^2 - 1} \quad (26)$$

Using the values of T computed from Equations 25 and 26 as well as $\hat{\pi}$ in Equation 23 with data from the three-textbook example presented earlier produced the 95% credibility or confidence intervals in FIG. 7, which includes corresponding traditional, frequentist results.

FIG. 7 shows separate error margins for the three different textbook groups, as well as their different population-proportion estimates under the four different procedures, corresponding in the case of the non-frequentist procedures to their different values of τ: 21, 232, and 487, respectively, for minimax, Fienberg and Holland, and π-on-P. The π-on-P procedure produced the narrowest margins of error. This result is not surprising since, as Equations 25 and 26 make clear, the $\tau_{\pi \mid P}$ for the π-on-P procedure is greater than the $\tau_{\pi \mid P}$ for the maximum-likelihood procedure, the difference diminishing as n gets large. According to Equation 24, the τ for the minimax procedure (√n) will also be smaller than the $\tau_{\pi \mid P}$ for the π-on-P procedure unless $$\hat{\rho}_{\pi P}^2 / (1 - \hat{\rho}_{\pi P}^2) \geq \sqrt{n},$$

which is not the case here. Since the standard error of the three non-frequentist procedures ranged between 0.01 and 0.02, the credibility intervals, as FIG. 6 shows, all have approximately 95% coverage.

Depending on which of the four estimation procedures they use, investigators looking at the study's result might come to entirely different conclusions. Since 0.33 bordered or lay outside the confidence or credibility interval of the older textbook in all but the π-on-P procedure, investigators using the three other procedures might conclude that the older textbook was less effective than the two new ones. An investigator using the π-on-P procedure, however, would not reach that conclusion. All three credibility intervals produced by that procedure, despite being generally narrower than the other by 0.02, contain the chance proportion 0.33. The conclusion following from this result is that further study is necessary before selecting a textbook for general use.

Comparison of Bayesian and Frequentist Procedures in the Two-Option Case

Figure 3:
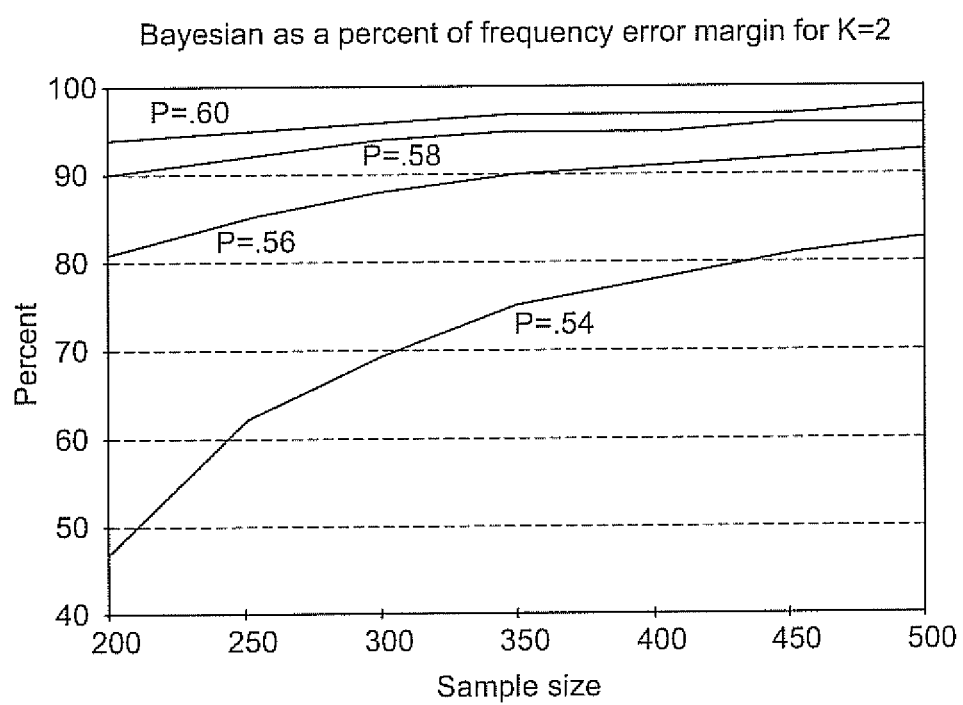
FIG. 3 illustrates Bayesian (π-on-P) as a percentage of frequentitst error margins in a two-option case.
Figure 4:
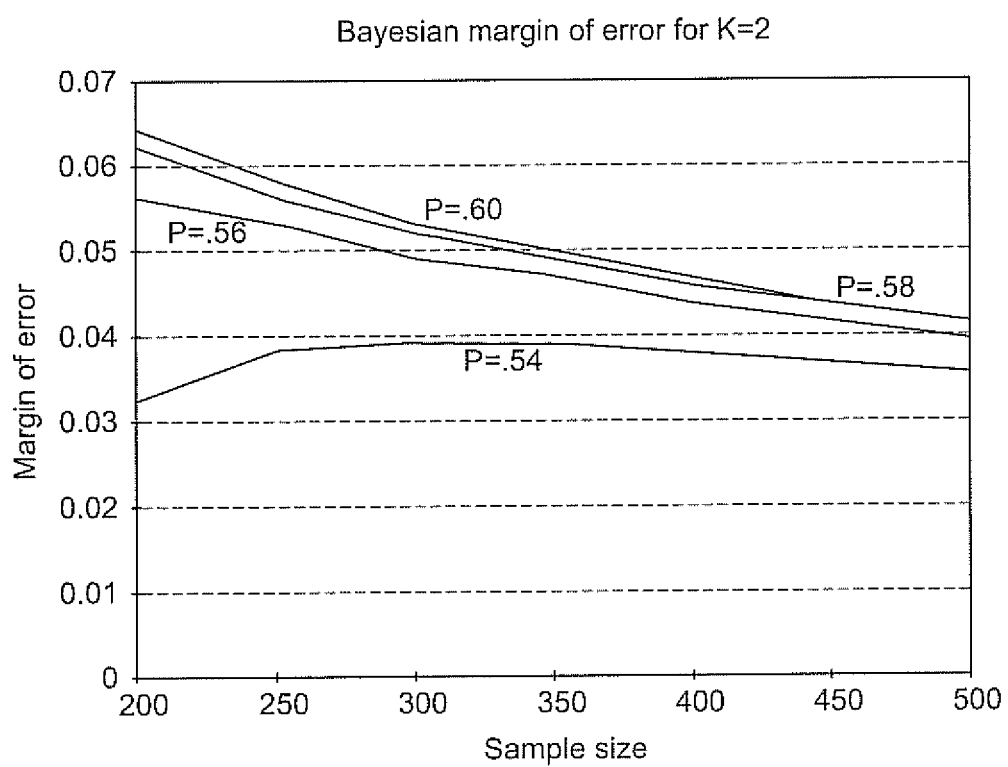
FIG. 4 illustrates Bayesian (π-on-P) error margins in the two-option case.
Figure 5:
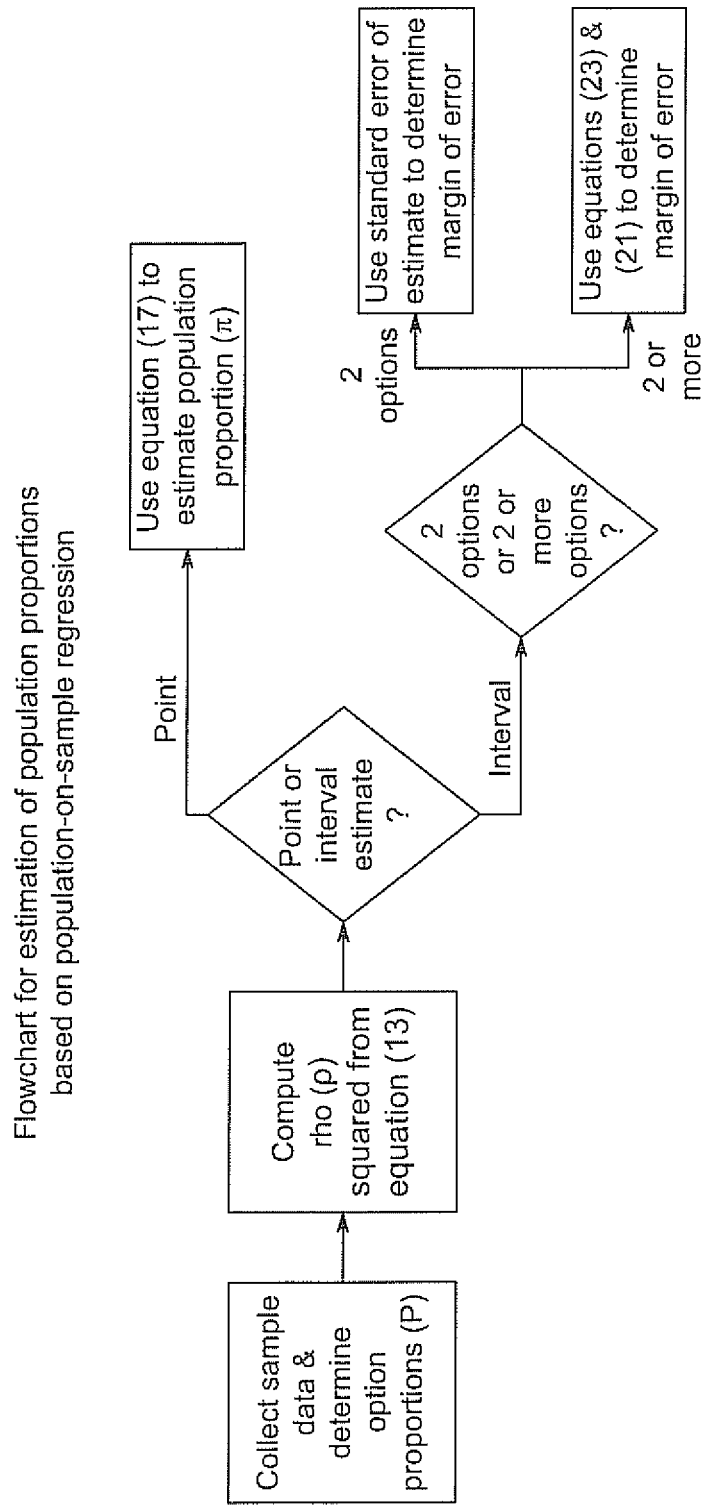
FIG. 5 shows a flow diagram of a π-on-P point and interval estimation.

FIGS. 3 and 4 provide a broader view of the frequentist and Bayesian (π-on-P) regression procedures. Limited to K=2, these figures show, for a range of sample sizes and P values, Bayesian margins of error as percents of frequentist margins of error (FIG. 3) and actual Bayesian margins of error (FIG. 4). The three high curves in each figure represent high $\hat{\rho}_{\pi P}^2$ values, approaching one for n=500, while the bottom curve (for P=0.54) represents a comparably low $\hat{\rho}_{\pi P}^2$ value. When $\hat{\rho}_{\pi P}^2$ is high, Bayesian and frequentist margins of error are very nearly equal, as are corresponding point estimates; when $\hat{\rho}_{\pi P}^2$ is low, Bayesian margins of error are low and point estimates are close to the mean, relative to their frequentist counterparts. For P values that are very close to the mean, $\hat{\rho}_{\pi P}^2$ can be so low that Bayesian point estimates are for all practical purposes equal to the mean, with margins of error effectively equal to zero. This is the case for P=0.52 when n≤500.

Is π-On-P an Empirical or a Purely Bayesian Procedure?

In regressing the observed proportion P toward the mean, 1/K, the squared correlation $\hat{\rho}_{\pi P}^2$ resembles the shrinkage coefficient w in Fienberg and Holland (1973) or 1−B in Efron and Morris (1973) and Morris (1983). Because the development using w or 1−B involves empirical Bayesian estimation, this resemblance suggests that π-on-P regression may also be empirical Bayesian. This is not the case, however.

The π-on-P procedure is a regression, not an empirical Bayesian, procedure. The difference is important. While estimates in both the π-on-P and the Fienberg and Holland (1973) procedures are expected values of π given P, both π and P may vary in empirical Bayesian estimation while only π may vary in estimation by π-on-P regression. If P as well as π were to vary in π-on-P regression, then the credibility intervals computed from the standard error of estimate would be too small, as the coverage proportions in FIG. 6 would be too large. The more apt comparison is with pure Bayesian estimation because in both this and π-on-P regression P is fixed while only π may vary. Because the regressed-on variables are fixed in regression estimation, the coverage proportions in Table 1 and their corresponding credibility intervals are accurate.

Shrinkage Coefficients as Slope Coefficients in Regression

Shrinkage coefficients may be interpretable as slope coefficients in regression. Stigler (1990) made this observation in relation to the work originated by James and Stein (1961), involving means. The squared correlation $\rho_{\pi P}^2$ is in fact the single-sample binary (0-1) data counterpart to the multi-sample shrinkage coefficient 1−B cited by Morris (1983) under the empirical Bayes assumption of normal distributions for both sample and population means. If for m samples, with m>2, $\sigma_{\bar{X}-\mu}^2$ and $\sigma_\pi^2$ are the respective variances of these distributions, then according to Morris, $$1 - B = \sigma_\mu^2 / (\sigma_\mu^2 + \sigma_{\bar{X}-\mu}^2),$$

which is the square of the correlation between μ and $\bar{X}$. In view of Equations 23 and 24, the shrinkage coefficient w in the Fienberg and Holland (1973) procedure is a consistent estimator of the squared correlation between n and P, the shrinkage coefficient developed here ($\hat{\rho}_{\pi P}^2$) being an unbiased estimator of it.

In the James-Stein case, $\sigma_{\bar{X}-\mu}^2=1$, so that the risk function of the traditional estimator $\bar{X}$ is equal to one for each value of μ. If μ has a normal distribution, then the posterior variance of μ given $\bar{X}$ is equal to 1−B and, as Efron and Morris (1973) observed, the risk function of the estimator (1−B)$\bar{X}$, which is the posterior mean of μ given $\bar{X}$ assuming μ to have a mean of zero, is smaller than the risk function of $\bar{X}$ by an amount equal to B. The estimator (1−B)$\bar{X}$ is the James-Stein estimator if B is replaced by $$(m-2)\sum_{i=1}^{m} \bar{X}_i^2,$$

whose expected value is equal to B because, with $\sigma_{\bar{X}-\mu}^2=1$ and 1/B the variance of $\bar{X}$, $$\sum_{i=1}^{m} \bar{X}_i^2$$

has a $\chi^2_m$ distribution with negative first moment equal to 1/(m−2). The James-Stein shrinkage coefficient $$1 - (m-2)\sum_{i=1}^{m} \bar{X}_i^2$$

is thus interpretable as an unbiased estimator of the square of the correlation between μ and $\bar{X}$, or as an unbiased estimator of the slope coefficient in the regression of μ on $\bar{X}$, the intercept being equal to zero.

Since $\hat{\rho}_{\pi P}^2$ is also an unbiased estimator, it corresponds in single-sample proportions estimation to the James-Stein shrinkage coefficient in multi-sample means estimation.

Figure 8:
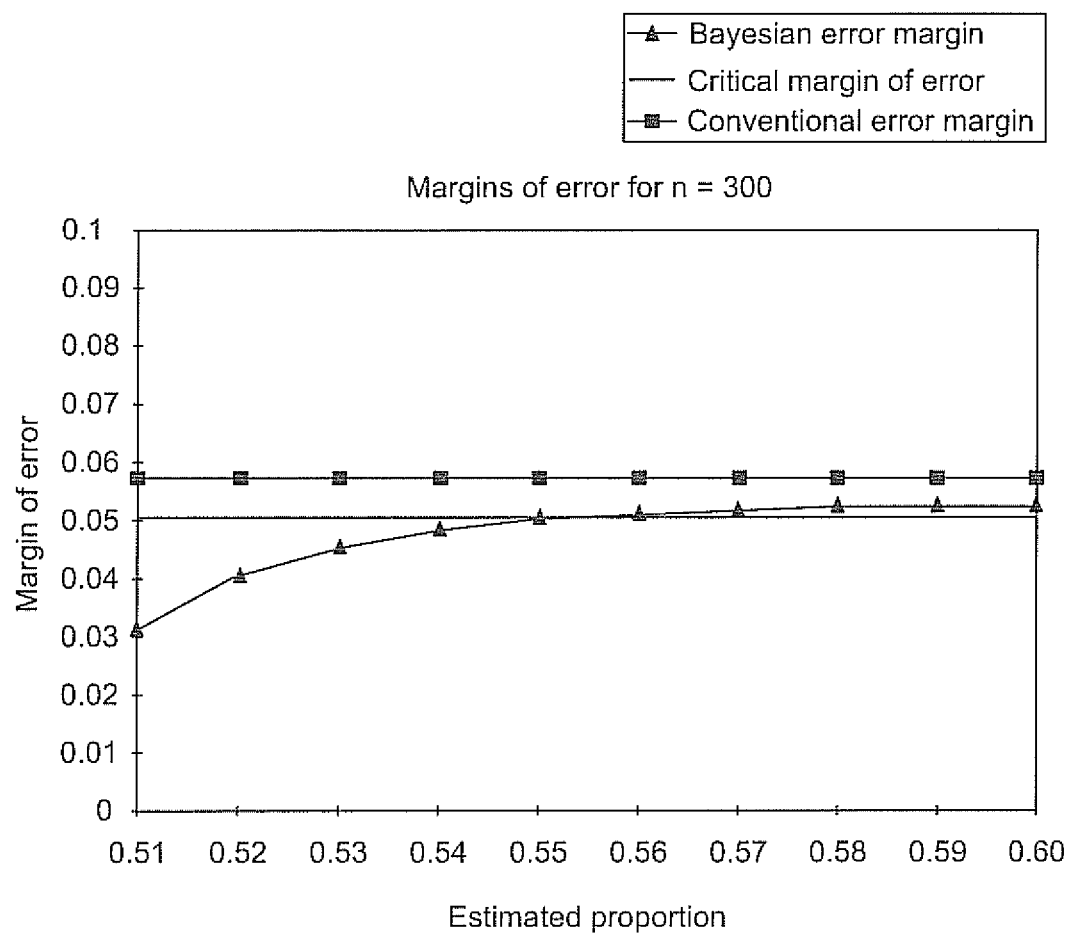
FIG. 8 shows a comparison of critical with Bayesian and conventional margins of error.

Bayesian Versus Conventional Margins of Error in the Estimation of Population Proportions The use of Bayesian (π-on-P) estimation of a population proportion requires an amended definition of margin of error. In the conventional or classical estimation, the margin of error depends only on sample size. In Bayesian estimation, the margin of error varies not only with sample size but also with the estimated population proportion obtained from the observed sample proportion. The margin of error that is meaningful in Bayesian estimation is the difference between 0.50 and the estimated population proportion. This margin of error is called the critical margin of error. When the estimated population proportion is 0.53, for example, the critical margin of error is 0.03 (0.53−0.50). If 0.53 is the Bayesian estimate of the population proportion in a sample large enough to produce a margin of error equal to 0.03 for a Bayesian-estimated population proportion of 0.53, then the conclusion from this result is that the population proportion is equal to 0.53 plus or minus 0.03 or, in other words, that the population proportion is marginally larger than 0.50. If for the same sample size the Bayesian population proportion estimate is larger than 0.53 (or smaller than 0.47), then that estimate plus or minus its error margin will exclude 0.50, as illustrated by the accompanying graph of a sample of size 300 (FIG. 8).

For conventional and Bayesian estimation of population proportions, FIG. 9 shows a table that compares samples sizes required to produce commonly used error margins. In the case of Bayesian estimation, the error margins are critical margins of error. For every error margin, Bayesian estimation requires a smaller sample than conventional estimation.

So far, this disclosure has shown that the regression of population on sample proportions constitutes Bayesian estimation of population proportions, while demonstrating how to perform this estimation on existing data. To apply this procedure to the conduct of a survey, what is needed is a method to determine the sample size n required to achieve a desired margin of error. In conventional or classical estimation, the method involves the use of a simple formula: n=0.96/m², where m designates the desired margin of error. For a margin of error equal to 0.03, for example, n=0.96/(0.03), or 1,067. This simple determination of sample size is possible because n is a function only of m in conventional estimation. Unfortunately, in Bayesian estimation the sample size is a function of two variables, the desired margin of error and the yet-to-be-observed sample proportion, which is itself a function of $\rho_{\pi P}^2$ and n, as shown in the following equation for $\rho_{\pi P}^2$ with K=2:

$$\rho_{\pi P}^2 = 2\left(\sqrt{((n-1)m^2)^2 + nm^2} - (n-1)m^2\right) \tag{27}$$

In conventional estimation, the margin of error is the distance between two boundaries that contain between them 95 percent of outcomes that could occur by chance. That is necessary because in this estimation the chance outcomes could occur with equal probability on either side of the null population value (equal to 0.50 when estimating probabilities with K=2). The occurrence of an observation outside the error margin nullifies that population value (meaning, when K=2, it is not equal to 0.50). The same necessity does not exist in Bayesian estimation, however, because in this case the observed value is considered fixed, meaning it cannot be on the other side of the null value, and the error margin needs only a boundary between it and the null value, the distance between the estimated value and the boundary being the margin of error (0.03, for example). Nullification occurs when the null value (0.50 when K=2) is outside this error margin. A one-sided error margin has a distinct advantage over a two-sided one, which divides the 5 percent nullification values into two equal 2.5 percent parts, one on either side. In the case of a one-sided error margin, all the 5 percent nullification values are on one side, the side where the null value is. A sample that has 5 percent of nullification values on a single side of an error-margin boundary must be smaller than one that has 2.5 percent there. That means a smaller sample will produce any desired margin of error in the one-sided than in the two-sided case. This sample-size advantage is in addition to the one that Bayesian estimation has even in the case of two-sided error margins. FIG. 9 provides an illustration for selected margins of error.

Substituting a constant value (like 0.03) for m and successive integer values of n in this equation, while at each simulation using the resulting value of $\rho_{xP}^2$ to determine the actual margin of error, until reaching the value of n that yields an actual error margin that is equal to the desired one (m) leads to the determination of the required sample size. This process requires the use of a computer.

In other embodiments of the regression of a true measurement on an observed measurement to be described below, the true measurement may be the probability of a correct response to an item by a particular person and the observed measurement may be an actual response by that person to that item. The probability of a correct response regressed on an observed measurement may be implemented in a delta single-parameter logistic modeling technique. Delta single-parameter logistic modeling includes receiving a response for each item and each test taker, and a total score for each test-taker. The correlation between the item response and the total test score or other ability measure over the plurality of test-takers is determined. A Bayesian-estimated probability of a correct response for each test-taker to each item is determined. The logit of this probability estimate is determined. The difficulty of an item is estimated as a function of the average logit over the number of test-takers. A test-taker's ability is likewise estimated as a function of the average logit and the average difficulty over the number of test items.

Figure 10A:
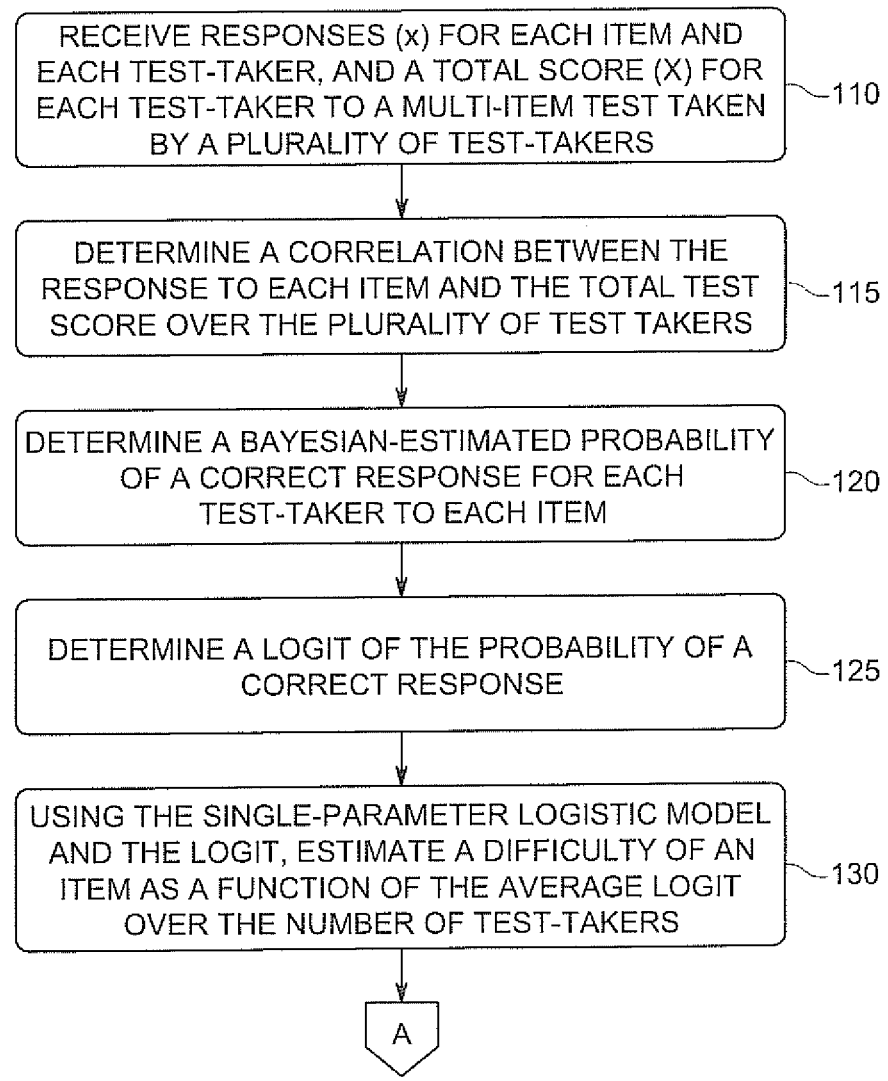
FIGS. 10A and 10B show a flow diagram of delta single-parameter logistic modeling methods, in accordance with a number of embodiments of the present technology.
Figure 10B:
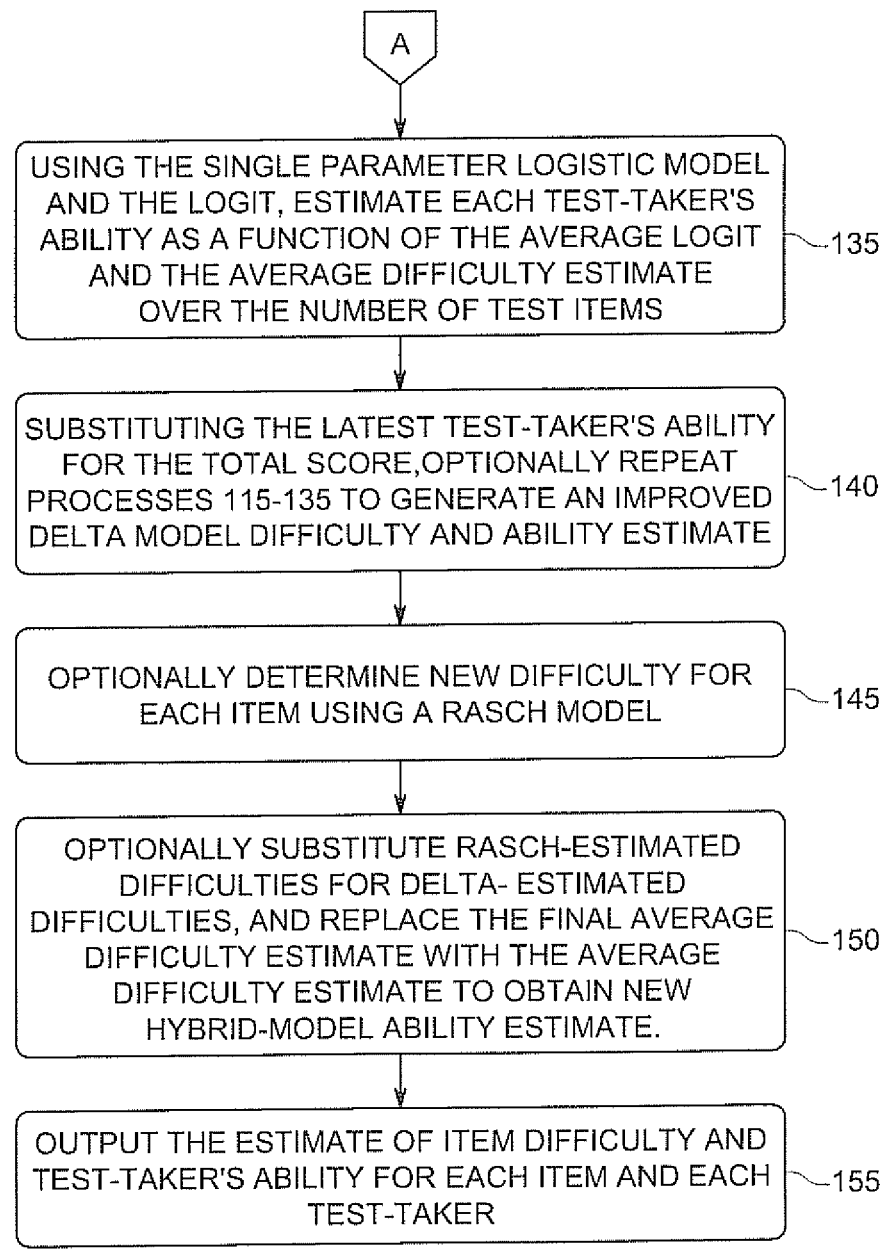

Referring now to FIGS. 10A and 10B, a delta single-parameter logistic modeling method, in accordance with a number of embodiments of the present technology, is shown. It is appreciated that method may be implemented in hardware, software, firmware and/or a combination thereof. The method may begin with receiving correct or incorrect item responses (x) for each test taker and each test item, and a total test score (X) for each test-taker, at 110. In one implementation, the test may be a multi-item test taken by a plurality of test takers. In one implementation, the value of the response (x) may be 1 if correct and 0 if incorrect.

At 115, a correlation ($\rho$) between the item response (x) and the total test score (X) over the plurality of test takers is determined. The correlation ($\rho$) incorporates item discrimination, which is the extent to which an item measures what it is supposed to measure (what the test as a whole measures). At 120, an initial Bayesian estimate of the probability (P) of a correct response for each test-taker to each item is determined as the weighted average of x and the proportion of test-takers who answer the item correctly, wherein the weights are $\rho^2$ for x and one minus $\rho^2$ for the proportion of test-takers who answer the item correctly.

At 125, a logit ($\lambda$) of the probability (P) is determined, wherein the logit of a probability is the natural logarithm of the ratio of the probability to it complement (i.e., one minus the probability). At 130, a difficulty of an item is estimated as minus the average logit ($\lambda$) over the number of test-takers. At 135, a given test-taker's ability ($\theta$) is estimated as the sum of the average difficulty (b) and the average logit ($\lambda$) over the number of test items. At 155, the difficulty of the item and the test-taker's ability are output. In one implementation, the results may be output by storing on a computing device readable medium (e.g., computer memory), displaying on a monitor (e.g., computer screen), and/or the like.

At 140, the processes of 115-135 may optionally be iteratively repeated, replacing the correlation between item response and total test score with the correlation between item response (x) and test-taker ability ($\theta$), one or more times or until a change in the given test-taker's ability ($\theta$) is less than a predetermined amount. In one implementation, the processes of 115-135 may be iteratively repeated until no estimate of given test-taker's ability ($\theta$) differs from its estimate on the preceding cycle by more than 0.004. In such an implementation, a given test-taker's ability ($\theta$) estimates are used until they settle into stable values, when the iterative process ends.

At 145, new difficulty (b) estimates for use in item banks and test-form equating may optionally be determined using a simple Rasch model. At 150, the process is to retain these Rasch b estimates while adding their average to each $\theta$ estimate obtained in processes 115-140 and subtracting from it the average b estimate obtained in these processes (115-140).

The processes of 115-135 are referred to herein as the delta single-parameter logistic model. The processes of 115-140 implement the delta single-parameter logistic model providing an improved test-taker's ability ($\theta$). The processes of 115-150, which combine the delta single-parameter logistic model for the test taker's ability ($\theta$) and the Rasch model for the item difficulty (b), is referred to herein as the hybrid model.

Embodiments of the present technology will be further elucidated in the following description, which will begin with data adjustment, moving from the test level to the item level via the point-biserial correlation $r_{xX}$ between item response (x) and test score (X). In classical test theory, this correlation, with the difference between the mean test score of examinees who get the item right and the mean test score of examinees who get the item wrong in the numerator (McNemar, 1962, p. 192), not only measures but in fact captures the precise meaning of item discrimination. The section following the next will describe parameter estimation in the fit of the Rasch model to item-response data adjusted by $r_{xX}$. (Throughout this description, lower-case x will refer to an item and upper-case X to a test.)

Logits: Observed Scores Vs. True-Score Estimates

The logit of a proportion or probability P is the natural logarithm of the ratio of P to (1−P). If $P_{iq}$ is the probability of a correct response to item i by examinee q, then for a two-parameter logistic model the logit of $P_{iq}$ is equal to $a_i(\theta_q - b_i)$. The next section will need an empirical counterpart of $P_{iq}$ that has a computable logit. In the Gulliksen version of classical test theory, the observed response $x_{iq}$, equal to zero or one, qualifies as such a counterpart, but $x_{iq}$ has no computable logit. The Kelley version of classical test theory suggests a solution to this problem: a weighted average of an observed score and the observed score mean for a single item, $$p_{iq} = r_{xX}^2 x_{iq} + (1 - r_{xX}^2) \bar{x}_i \tag{27}$$

where $\bar{x}_i$ is the item difficulty, equal to the mean of $x_{iq}$ over q, and $r_{xX}$, as noted earlier, is a measure of item discrimination. Unless $r_{xX}$ is equal to one, which is not possible for a point-biserial correlation, or xi is equal to zero or one, $P_{iq}$ will always have a computable logit.

The use of $P_{iq}$ rather than $x_{iq}$ as the empirical counterpart of $P_{iq}$ makes rational as well as mathematical sense, especially for multiple-choice items. On a zero-to-one scale, the value of one is arguably too large a measure for a correct item response in this case. Not only may the knowledge or skill measured by an item be at least partially irrelevant but also a correct response does not necessarily reflect that knowledge or skill. Guessing may play a role. The effect of guessing, however, also depends on the item's discrimination. An examinee who gets the item right is more likely to have a high test score and thus be more generally knowledgeable on the subject tested if the item is highly discriminating than otherwise. This difference is properly reflected in the value of $p_{iq}$. If $x_{iq}=1$ for each of two items that vary in discrimination, the value of $p_{iq}$ will be closer to one for the more discriminating than for the less discriminating item. A like argument applies in the case of incorrect answers to the two items. A correct answer has a greater positive effect and an incorrect answer a greater negative effect on $p_{iq}$ if made to a more discriminating than to a less discriminating item in contrast to the uniformly equal positive and negative effects on $x_{iq}$. For a multiple-choice item and arguably for any item scored on a zero-to-one scale, $p_{iq}$ will generally be a more precise reflection of relevant item knowledge than $x_{iq}$.

Fitting the Model to Data

Transformation of the single-parameter logistic model of Equation (1) to a logit form permits the accommodation of item discrimination and difficulty in model fit. With the addition of the indices i and q, Equation (1) has the logit form $$\ln\left(\frac{P(\theta_q; b_i)}{1 - p(\theta_q; b_i)}\right) = \theta_q - b_i \tag{28}$$

the left side corresponding empirically to $\ln(P_{iq}/[1-P_{iq}])$, the logit of $p_{iq}$. If $\lambda_{iq} = \ln(P_{iq}/[1-P_{iq}])$, then empirically the logit form of the single-parameter logistic model is a regression equation like X=T+E of classical test theory, $\varepsilon_{iq}$ denoting error:

$$\lambda_{iq} = (\theta_q - b_i) + \varepsilon_{iq} \tag{29}$$

so that, as ordinary least-squares estimates assuming the average $\theta$ to be equal to zero, $$\hat{b}_i = -\bar{\lambda}_i \tag{30}$$

and $$\hat{\theta}_q = \bar{\lambda}_q + \bar{b} \tag{31}$$

$\bar{\lambda}_i$ being the mean of $\lambda_{iq}$ over q, $\bar{\lambda}_q$ the mean of $\lambda_{iq}$ over i, and $\bar{b}$ the mean item difficulty. All computation of item statistics in this and subsequent sections are over q.

Since $\hat{b}_i$ is a mean and $\hat{\theta}_q$ a sum of means, estimates of their sampling variances are, respectively, $$\hat{\sigma}_{b_i}^2 = \frac{\sum_{q=1}^{N}(\lambda_{iq} - \bar{\lambda}_i)^2}{N(N-1)} \tag{32}$$

and $$\hat{\sigma}_{\theta_q}^2 = \frac{\sum_{i=1}^{N}(\lambda_{iq} - \bar{\lambda}_q)^2}{n(n-1)} + \frac{\sum_{i=1}^{n} \hat{\sigma}_{b_i}^2}{n^2} \tag{33}$$

Despite their apparent equivalence, differing only by a scale conversion, $\vartheta_q$ and $(\vartheta_q - b_i)$ cannot both be true scores, like T. Just as a true score in classical test theory must be both test- and examinee-dependent, so a true score for an item in modern test theory must be both item- and examinee-dependent. This is the case for $(\vartheta_q - b_i)$, but not for $\vartheta_q$, which is only examinee-dependent, though both $\theta_q$ and $(\vartheta_q - b_i)$ have equal standard deviations and correlations with other variables.

For a single sample, in fact, the correspondence between T and $\vartheta_q - b_i$ is striking if, following common practice, the mean of $\theta$ is assumed to be zero. In this case, just as the mean of T ($\bar{T}$), being equal to the proportion of examinees ($\bar{X}$) who get the item right, is the measure of item difficulty in classical test theory, so the mean of $\vartheta_q - b_i$ over examinees is equal to minus the measure of item difficulty ($b_i$) in modern test theory. While $\bar{X}$ decreases, minus the mean of $\vartheta_q - b_i$ over examinees increases with increasing item difficulty.

The accommodation of varying item discrimination by using the true-response estimates $p_{iq}$ to estimate $b_i$ and $\theta_q$ occurs without the use of the parameter $\alpha_i$. The resulting single-parameter logistic model retains the parameter-separation but not the unweighted-scores property of the Rasch model, a price paid for by the accommodation of varying item discrimination. As weighted scores, the true-response estimates $p_{iq}$ reflect varying item discrimination in contrast to the observed responses $x_{iq}$ which do not. The combination of a weighted average like the Kelley estimation model of classical test theory with the Rasch model of modern test theory extends the usefulness of the single-parameter logistic model empirically to tests consisting of items that vary substantially in discrimination.

The Parameter α and Item-Test Correlation

In classical test theory, as noted earlier, the correlation between the response x (0 or 1) to an item and total test score X provides a measure of the discrimination of the item. According to Lord and Novick (1968, p. 378, Equation 16.10.7), in the case of the two-parameter normal-ogive model with θ assumed to have a standard normal distribution ($\mu_\theta=0$ and $\sigma_\theta=1$), the slope parameter α has the following relationship to a correlation similar to $r_{xX}$: $\alpha=r_{x\theta}/\sqrt{1-r_{x\theta}^2}$, where $r_{x\theta}$ is a biserial correlation between θ and x equal to either zero or one depending on the value of a latent item-knowledge variable (y) having a standard normal distribution ($\mu_y=0$ and $\sigma_y=1$). The numerator in the formula for this correlation, like the numerator in the corresponding formula for $r_{xX}$, involves the difference between the mean θ of examinees who get the item right and the mean θ of examinees who get the item wrong (McNemar, 1962, p. 189). Since $r_{x\theta}/\sqrt{1-r_{x\theta}^2}$ is a direct function of $r_{x\theta}$, α in the two-parameter normal-ogive model is a measure of item discrimination in the tradition of classical test theory.

In this tradition, Birnbaum (1968, pp. 402-403) in fact justified the need to measure discrimination in item response models by citing standard deviations of actual item-test correlations ($r_{xX}$) that were too large to occur by chance. This illustration is of interest here for two reasons: Birnbaum recognized (a) the near-equivalence of X and θ and (b) the role of dichotomous item response measures (x) in the measurement of item discrimination (" ... item-test biserials approximate item-ability biserials ... "). The remainder of this section examines the relationship between item discrimination and the parameter a in Birnbaum's two-parameter logistic model.

Like the normal-ogive model, the two-parameter logistic model must make two assumptions in order to have $\alpha_i$ as a slope parameter of $(\theta_q-b_i)$. A straightforward way to expose the two assumptions in this case is to change the scale of θ by multiplying $(\theta_q-b_i)+\varepsilon_{iq}$ through by the value of $\alpha_i$ (different from a regression coefficient) that will make the standard deviation of the product of $\alpha_i$ and $\varepsilon_{iq}$ equal to one ($S_{\alpha_i\varepsilon_{iq}}=1$) while assuming, as is traditionally the case, that $S_\theta=1$. Just as X=T+E in classical test theory implies that $S_T=r_{XT}S_X$, so in modern test theory $\lambda_{iq}=(\theta_q-b_i)+\varepsilon_{iq}$ implies that $S_\theta=r_{\lambda\theta}S_\lambda$. Since $S_{\alpha_i\varepsilon_{iq}}=1$ and $S_\theta=r_{\lambda\theta}S_\lambda=1$, $$\alpha_i\varepsilon_{iq} = \frac{\varepsilon_{iq}}{s_{\varepsilon_{iq}}} = \left(\frac{1}{S_\lambda\sqrt{1-r_{\lambda\theta}^2}}\right)\varepsilon_{iq} = \left(\frac{r_{\lambda\theta}S_\lambda}{S_\lambda\sqrt{1-r_{\lambda\theta}^2}}\right)\varepsilon_{iq} = \left(\frac{r_{\lambda\theta}}{\sqrt{1-r_{\lambda\theta}^2}}\right)\varepsilon_{iq} \quad (34)$$

which shows that the value of $\alpha_i$ corresponds to the value presented by Lord and Novick (1968, p. 378) and by Lord (1980, pp. 31-32) in the normal-ogive case: $r_{x\theta}/\sqrt{1-r_{x\theta}^2}$, λ like x being a two-valued variable measuring the response to an item. (In fact, $r_{\lambda\theta}=r_{x\theta}$.) In Equation (12), the second value $$\left(\frac{\varepsilon_{iq}}{s_{\varepsilon_{iq}}}\right)$$

is the standardized value of $\varepsilon_{iq}$, whose standard deviation is equal to one. The two assumptions are $S_{\alpha_i\varepsilon_{iq}}=1$ and $S_e=1$.

Iteration from $r_{xX}$ to $r_{x\theta}$

The near-equivalence of X and θ cited by Birnbaum (1968) suggests the use of iteration to estimate $\theta_q$ and $b_i$ by way of $\lambda_{iq}$. The first step in the iteration is to use $r_{xX}$ to estimate $\lambda_{iq}$, as described earlier. Subsequent steps use $r_{x\theta}$, the θ values being obtained from the preceding step. Iteration continues till the estimates of both θ and b stabilize. Since $r_{x\theta}=r_{x(\theta-b)}$, the result of this procedure corresponds precisely at the item level to Kelley's at the test level, (θ−b) and T both being true scores, as indicated earlier. Since the parameter a is a function of $r_{x\theta}$ or $r_{\lambda\theta}$ (the two being equal), the use of $r_{\lambda\theta}$ to measure item discrimination is tantamount to the use of α to do so in the two-parameter normal-ogive and logistic models. Test analysts who wish to follow the Verhelst and Glas (1995) approach to the accommodation of varying item discrimination in a single-parameter logistic model can also use $r_{\lambda\theta}$ in $\alpha=r_{xX}/\sqrt{1-r_{xX}^2}$ or $r_{x\theta}$ in $\alpha=r_{x\theta}/\sqrt{1-r_{x\theta}^2}$ to help determine the "constant" value of α in their model. The second of these is the equation used in the following numerical example.

Numerical Example

This section describes the use of simulated data to compare the single-parameter model in its traditional Rasch form with the form described here, as well as a number of variations of each. The data consisted of individual item responses (0's and 1's) on 10-, 20-, and 30-item tests, each administered to 1,000 examinees. The θ values were randomly selected from a standard normal distribution. The b values for the 10-item test were −1.5, −0.75, 0, 0.75, and 1.5, each repeated once. These ten values were duplicated in the 20-item test and triplicated in the 30-item test. Items created to have each b value were also created to have either of two values of $r_{x\theta}$. One is the maximum possible value for its difficulty, point-biserial correlations having maximum values less than one, and the other is 0.144, chosen to make the mean $r_{x\theta}$ for a test equal to 0.400. Table 1 shows these $r_{x\theta}$ values in the third-to-last row.

Data creation. Using the θ values and item specifications just described, the following regression equation yielded the probability of a correct response, $P_{iq}$, for each item and each examinee: $P_{iq}=\sqrt{\bar{P}_i(1-\bar{P}_i)}r_{x\theta}\theta_q+\bar{P}_i$, where $\bar{P}_i$ is the mean over examinees of $1/(1+e^{-(\theta_q-b_i)})$. This equation for $P_{iq}$ accommodates both item difficulty ($\bar{P}_i$) and item discrimination ($r_{x\theta}$) in the determination of the probability of a correct response. Comparison of $P_{iq}$ with $R_{iq}$, a random number uniformly distributed between 0 and 1, resulted in the simulated response: 1 if $R_{iq} \leq P_{iq}$, 0 otherwise. This procedure determined the response of each examinee to each item on each of the three tests.

Comparison of models. To facilitate comparison with other models, the model described here will be called the delta model because it involves an increment to the single-parameter logistic model to account for item discrimination. In addition to the Rasch model, these other models are the Rasch K model, a single-parameter model described by Verhelst and Glas (1995) that has a "constant" (unfitted) discrimination parameter (α) that may differ in value from item to item, the biserial delta model that uses biserial instead of point-biserial correlations for $r_{x\theta}$ in the delta model, and a hybrid model involving Rasch model estimates of b and delta model estimates of θ. The focus of the comparisons will be on the correlations of b and θ estimates with their true values.

Estimation procedures. The estimation procedures differed for the Rasch and the delta models. Estimation for the Rasch and Rasch K models used the maximum-likelihood procedure described by Wright and Panchapakesan (1969), with Newton-Raphson iteration. Involving least squares, estimation for the delta and biserial delta models used Equations (8) and (9) together with the iteration procedure described in the preceding section. Iteration continued till the difference between successive estimates was equal to zero, to two decimal places. The "constant" discrimination parameter a used in the Rasch K model for each item was equal to $r_{x\theta}/\sqrt{1-r_{x\theta}^2}$, the $\theta$ values being the ones estimated separately for each test with the delta model. Both the Rasch and the delta estimation procedures involved joint (b and $\theta$) estimation without any distributional assumptions.

Estimation for the hybrid model used the Rasch procedure for b and, with the b values fixed at their Rasch estimates, the delta procedure for $\theta$.

Results. The five models lined up differently for the estimation of b and the estimation of $\theta$. One tied at the top for b but not for $\theta$, one tied at the top for $\theta$ but not for b, and one tied at the top for both. Two did not fare well for either b or $\theta$. The b comparisons involved only the items in the 10-item test, the items in the other tests being specification replicates of these items. The $\theta$ comparisons involved all three tests.

Figures 11, 12:
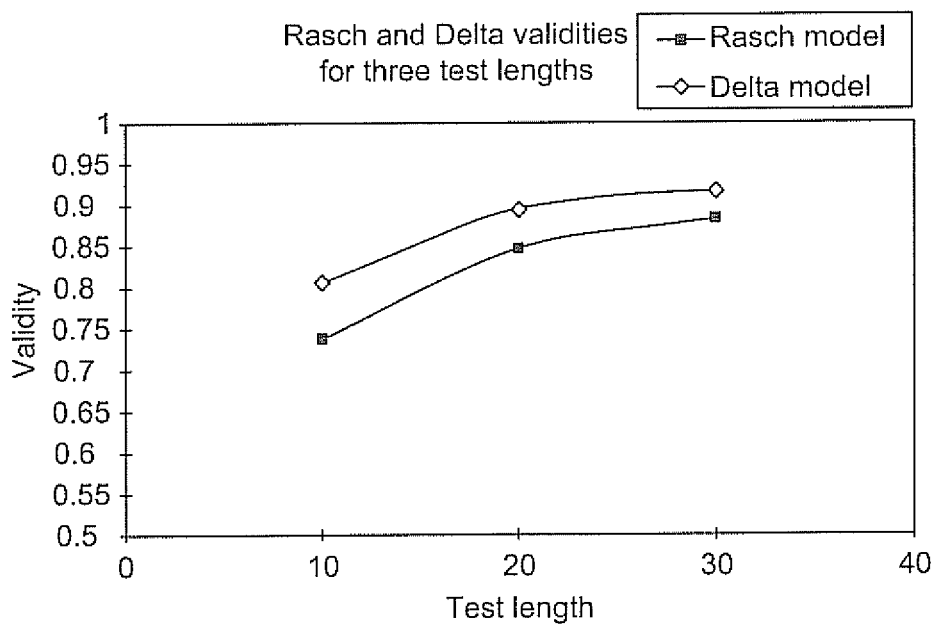
FIG. 11 shows a table comparing item difficulties and item discrimination data for various modeling techniques.
FIG. 12 shows a graph comparing Rasch and delta single-parameter logistic model validities.

Referring now to the table in FIG. 11, the b results are shown. The top part of the table displays the difficulty and the bottom part the discrimination data for the ten items. The fourth row, labeled "True" in the left column, contains the values of b and the third-from-bottom row contains the values of $r_{x\theta}$ used to create the item responses. The remaining rows contain data obtained by parameter estimation. The numerically labeled columns in the top part of the table display the b estimates ($\hat{b}$) for the ten items obtained from the use of each of the five models, as well as the mean of these estimates and the correlation, $r_{\hat{b}b}$, between them and their true values. The $r_{\hat{b}b}$ correlations are substantially lower for the biserial delta, Rasch K, and delta models than for the Rasch and hybrid models, being close to one for the latter two. The mean b estimates are also substantially farther from the true mean for the delta, biserial delta, and Rasch K models than for the Rasch and hybrid models, whose common mean (−0.01) is very nearly equal to the true mean (0.00). The row labeled $\hat{\alpha}$ contains the $\alpha$ estimates for the ten items, along with their mean. The bottom row contains values of the t-Fit statistic described by Wright and Masters (1982, Ch. 5) and Masters (1988). These statistics are interpretable more or less like t statistics, highly negative values expected for items of high discrimination and highly positive values expected for items of low discrimination. The data bore out these expectations, as comparison of the t-Fit values with the $\alpha$ estimates in the second-to-last row and the $r_{x\theta}$ values in the third-to-last row shows.

The line-up of the Rasch and delta models was just the opposite for $\theta$ estimation, the hybrid model holding the same position in both comparisons. Measuring internal validity, the correlations of the $\theta$ estimates with their true values, which increased with test size, were substantially higher in all three tests for the delta and hybrid models (0.807, 0.895, and 0.916) than for the biserial delta model (0.790, 0.860, and 0.895) and the Rasch (0.740, 0.848, and 0.883) and Rasch K (0.679, 0.790, and 0.859) models. Referring now to FIG. 12, results for the delta and hybrid models (top curve) and the Rasch model (bottom curve) are shown. Of particular interest, seen clearly in this figure, is that the delta and hybrid correlation for the 20-item test was higher than the Rasch correlation for the 30-item test.

Discussion Although the focus here is on the comparison between the Rasch model and the delta model, consideration of the internal-validity standings of the other models is also informative. In yielding unfitted though reasonably differing slopes for the item response curves, the Rasch K model yielded b and $\theta$ estimates that had lower internal validities than those of the Rasch model. The biserial delta model sharpened the $r_{x\theta}$ differences among the items but, in so doing, distorted both the b and the $\theta$ estimates with a consequent degradation in the internal validities of both. In any case, use of either of these models in practice would be expected to produce no better internal validities for either b or $\theta$ than their Rasch and delta counterparts.

Because a trade-off exists between test length and item discrimination in their effects on the internal validity of a test (the higher the average item discrimination the lower the test length needed to achieve a specific internal validity), use of a model that weights items directly according to their discrimination measures should produce $\theta$ estimates having higher internal validities than use of a model that does not, all else equal. Estimates of $\theta$ should, accordingly, have a higher internal validity when produced by the delta model than when produced by the Rasch model from the same test data. That difference is precisely what the results here show for each of the three tests. The difference is in fact so great that, as noted earlier, use of the delta model on the 20-item test produced $\theta$ estimates that had a higher internal validity than use of the Rasch model on the 30-item test.

The superiority of the delta over the Rasch model applies only to the estimation of $\theta$. In the estimation of b, the Rasch model is superior to the delta model with respect to both the internal validities and the means of the estimates. This difference is especially important for test developers who maintain item banks and use anchor items in equating tests.

When one model is better for $\theta$ and the other for b estimation and when the estimation of both are important, as they both are, which model is a test developer or analyst to use? That question motivated the addition of the hybrid model to the study. The parameter separation that exists in both the Rasch and the delta models suggested that the hybrid model might share the advantages of both. The results confirmed this expectation. Use of the hybrid model in each test resulted in $\theta$ estimates that had the internal validity of the delta model and b estimates that had the internal validity, as well as the mean, of the Rasch model. In the line-up of all five models, the hybrid model was clearly the best in both $\theta$ and b estimation.

To study the effect of differences in item discrimination on parameter estimation, the data were created in an attempt to maximize these differences while maintaining a reasonable mean value. The t-Fit statistics, shown in the bottom row of the table in FIG. 11, indicate that this attempt was successful. Although the dispersion of item discrimination measures in actual data is not likely to be so large as in the data studied here, some dispersion will always occur in practice. The differential effects found in this simulation study may correspondingly be smaller in the real world, but they will nevertheless exist there. While retaining the Rasch model's advantages in the estimation of item difficulties, use of the hybrid model will make the existence of real-world differences in item discrimination less of a challenge than it would be with use of the Rasch model.

Test developers or analysts reading the description in this specification may wonder why they should fit a single-parameter model to accommodate varying item discrimination when the option exists simply to use the two-parameter logistic or normal-ogive model for the same purpose. One important reason may be this: Single-parameter models do not permit the crossing of item response curves that two-parameter models do. Another reason, at least as important: Like the delta model, two-parameter models may distort the distribution of b estimates in the process of increasing the precision of $\theta$ estimation. The first is a theoretical, the second a practical problem. The hybrid model avoids both.

Embodiments of the present technology can be used in various applications of single-parameter logistic models, which yield the probability of an outcome as a function of the ability of the performer and the difficulty of the job whenever the purpose of these applications is to obtain estimates of performer ability and job difficulty. Use of embodiments of the present technology will result in improved estimation of performer ability and, combined with the Rasch model, improved estimation of job difficulty, as well. Examples of other applications include baseball, involving a player's ability to hit and the difficulty of hitting a pitcher, and spelling bees, involving the spelling ability of a contestant and the difficulty of a word to be spelled. It is, however, appreciated that embodiments of the present technology are not limited to these examples.

The foregoing descriptions of specific embodiments of the present technology have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is intended that the scope of the invention be defined by the claims appended hereto and their equivalents.

What is claimed is:

1. A method comprising:
specifying a desired margin of error for a Bayesian point estimate of an actual population proportion of individuals choosing a particular one of a plurality of options;
determining a sample size needed to achieve the desired margin of error by simulating samples of different sizes, each yielding a Bayesian point estimate equal to the desired margin of error plus a number equal to one divided by the number of the plurality of options, the determined sample size being the one yielding the desired margin of error;
obtaining from a population of individuals each choosing one of the plurality of options an independent random sample of the size determined to yield the desired margin of error; and
estimating the actual population proportion of individuals choosing the particular one of the plurality of options from a simple Bayesian regression of the estimated population proportion on the computed proportion of individuals in the sample choosing the particular one of the plurality of options using an unbiased classical, non-Bayesian estimator of a square of the correlation between the population proportions and the sample proportions over the plurality of options as the regression coefficient,
wherein said sample size is less than a sample size required to achieve said desired margin of error determined without said simulating and said estimating.

2. The method according to claim 1, wherein the square of the correlation between the population proportions and sample proportions over the plurality of options is a function of (a) a sum of squares of the sample proportions over the plurality of options computed from the sample of the determined size, (b) the number of the plurality of options, and (c) the determined sample size.

3. The method according to claim 1, further comprising estimating an actual credibility interval as a function of a posterior variance of the population proportion of individuals choosing the particular one of the plurality of options.

4. The method according to claim 3, further comprising estimating the actual credibility interval as a function of a Bayesian point estimate of the actual population proportion and a total of parameters of a Dirichlet distribution, which itself is a function of the determined sample size and the square of the correlation between the population proportions and the sample proportions over the plurality of options.

5. The method according to claim 3, further comprising estimating the actual credibility interval as equal to a Bayesian point estimate of the actual population proportion of individuals choosing the particular one of the plurality of options plus or minus 1.96 times a square root of a posterior variance of the population proportion of individuals choosing the particular one of the plurality of options, that substantially includes 95 percent of possible values of the population proportion, while being smaller than a corresponding confidence interval determined from a conventional estimation of a population proportion.

6. The method according to claim 5, wherein, uniquely applicable to Bayesian estimation, an actual credibility interval including the Bayesian point estimate of an actual population proportion and containing 95 percent of the possible values of the actual population proportion of individuals choosing the particular one of the plurality of options can have only a single boundary located in the direction from the point estimate toward the mean population proportion at a distance from the point estimate equal to 1.6457 times a square root of a posterior variance of the population proportion of individuals choosing the particular one of the plurality of options.

7. The method according to claim 6, wherein the sample size required for any desired margin of error is even smaller than it is for a credibility interval having two boundaries at a distance on either side of the Bayesian point estimate equal to 1.96 times a square root of a posterior variance of a population proportion and containing 95 percent of the possible values of the population proportion.

8. The method according to claim 1, wherein the Bayesian point estimate of a population proportion has a smaller margin of error for any sample size or requires a smaller sample size for any desired margin of error than a conventionally estimated population proportion.

9. The method according to claim 1, wherein a mean of the population proportions and a mean of the sample proportions over the plurality of options are each equal to an inverse of the number of the plurality of options.

10. The method according to claim 1, wherein the square of the correlation between the population proportions and the sample proportions over the plurality of options functions as a shrinkage coefficient.

11. The method according to claim 1, further comprising estimating an actual margin of error for a point estimate calculated from the simple Bayesian regression of the estimated population proportion on the computed sample proportion via a Dirichlet distribution formula if the number of the plurality of options is equal to or greater than two.

12. The method according to claim 1, further comprising estimating an actual margin of error for a point estimate calculated from the simple Bayesian regression of the estimated population proportion on the computed sample proportion via a formula for the standard error of estimate if the number of the plurality of options is equal to two.

13. A non-transitory computer-readable medium having instructions stored thereon that, responsive to execution by an electronic system, cause said electronic system to perform operations, the operations comprising:

specifying a desired margin of error for a Bayesian point estimate of an actual population proportion of individuals choosing a particular one of a plurality of options;

determining a sample size needed to achieve the desired margin of error by simulating samples of different sizes, each yielding a Bayesian point estimate equal to the desired margin of error plus a number equal to one divided by the number of the plurality of options, the determined sample size being the one yielding the desired margin of error;

obtaining from a population of individuals each choosing one of the plurality of options an independent random sample of the size determined to yield the desired margin of error; and estimating the actual population proportion of individuals choosing the particular one of the plurality of options from a simple Bayesian regression of the estimated population proportion on the computed proportion of individuals in the sample choosing the particular one of the plurality of options using an unbiased classical, non-Bayesian estimator of a square of the correlation between the population proportions and the sample proportions over the plurality of options as the regression coefficient, wherein said sample size is less than a sample size required to achieve said desired margin of error determined without said simulating and said estimating.

14. The non-transitory computer readable media of claim 13 wherein the square of the correlation between the population proportions and sample proportions over the plurality of options is a function of (a) a sum of squares of the sample proportions over the plurality of options computed from the sample of the determined size, (b) the number of the plurality of options, and (c) the determined sample size.

15. The non-transitory computer readable media of claim 13 wherein the operations further comprise:

estimating an actual credibility interval as a function of a posterior variance of the population proportion of individuals choosing the particular one of the plurality of options.

16. The non-transitory computer readable media of claim 15 wherein the operations further comprise:

estimating the actual credibility interval as a function of a Bayesian point estimate of the actual population proportion and a total of parameters of a Dirichlet distribution, which itself is a function of the determined sample size and the square of the correlation between the population proportions and the sample proportions over the plurality of options.

17. The non-transitory computer readable media of claim 15 wherein the operations further comprise:

estimating the actual credibility interval as equal to a Bayesian point estimate of the actual population proportion of individuals choosing the particular one of the plurality of options plus or minus 1.96 times a square root of a posterior variance of the population proportion of individuals choosing the particular one of the plurality of options, that substantially includes 95 percent of possible values of the population proportion, while being smaller than a corresponding confidence interval determined from a conventional estimation of a population proportion.

18. The non-transitory computer readable media of claim 13 wherein the Bayesian point estimate of a population proportion has a smaller margin of error for any sample size or requires a smaller sample size for any desired margin of error than a conventionally estimated population proportion.

19. The non-transitory computer readable media of claim 13 wherein a mean of the population proportions and a mean of the sample proportions over the plurality of options are each equal to an inverse of the number of the plurality of options.

20. The non-transitory computer readable media of claim 13 wherein the square of the correlation between the population proportions and the sample proportions over the plurality of options functions as a shrinkage coefficient.

* * * * *